US009686700B2

(12) United States Patent
Wang et al.

(10) Patent No.: US 9,686,700 B2
(45) Date of Patent: Jun. 20, 2017

(54) METHOD, DEVICE AND SYSTEM FOR COLLECTING AND IDENTIFYING INTERFERENCE

(71) Applicant: Huawei Technologies Co., Ltd., Shenzhen (CN)

(72) Inventors: Yungui Wang, Nanjing (CN); Min Peng, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 170 days.

(21) Appl. No.: 14/694,782

(22) Filed: Apr. 23, 2015

(65) Prior Publication Data
US 2015/0230111 A1 Aug. 13, 2015

Related U.S. Application Data

(63) Continuation of application No. PCT/CN2012/083718, filed on Oct. 30, 2012.

(51) Int. Cl.
*H04W 24/08* (2009.01)
*H04W 24/04* (2009.01)
(Continued)

(52) U.S. Cl.
CPC .......... *H04W 24/08* (2013.01); *H04W 4/06* (2013.01); *H04W 24/04* (2013.01); *H04L 12/189* (2013.01)

(58) Field of Classification Search
CPC ....... H04W 24/04; H04W 24/08; H04W 4/06; H04W 84/12; H04W 52/244; H04L 12/189
See application file for complete search history.

(56) References Cited

U.S. PATENT DOCUMENTS 7,929,508 B1 * 4/2011 Yucek ................... H04W 72/06
370/338
2009/0327333 A1 12/2009 Diener et al.
(Continued)

FOREIGN PATENT DOCUMENTS

CN 1618247 A 5/2005
CN 1635723 A 7/2005
(Continued)

OTHER PUBLICATIONS

Foreign Communications From a Counterpart Application, European Application No. 12887615.8, Extended European Search Report dated Nov. 2, 2015, 9 pages.
(Continued)

*Primary Examiner* — Paul H Masur
(74) *Attorney, Agent, or Firm* — Kilpatrick Townsend & Stockton LLP

(57) ABSTRACT

A method for collecting and identifying interference, which includes requesting each access point device to collect spectrum information, so as to determine interference sources of spectrum information that belongs to a same interference type and is collected by the at least two access point devices, and extracting, from the spectrum information collected by the at least two access point devices, the spectrum information that belongs to the same interference type; matching characteristic sequences of the interference sources, and calculating an overlapping characteristic match value so as to determine whether the match value is greater than a preset threshold, and if the match value is greater than the preset threshold, determining that the extracted spectrum information is from a same interference source, and if the match value is not greater than the preset threshold, determining that the extracted spectrum information is from different interference sources.

11 Claims, 9 Drawing Sheets

(51) Int. Cl.
*H04W 4/06* (2009.01)
*H04L 12/18* (2006.01)

(56) References Cited

U.S. PATENT DOCUMENTS

| | | | |
|---|---|---|---|
| 2011/0188544 A1 | 8/2011 | Ponnuswamy | |
| 2011/0242984 A1* | 10/2011 | Ponnuswamy | H04L 41/22 370/241 |
| 2011/0243021 A1* | 10/2011 | Ponnuswamy | H04L 41/22 370/252 |
| 2013/0201863 A1* | 8/2013 | Chan | H04W 24/08 370/253 |

FOREIGN PATENT DOCUMENTS

| | | |
|---|---|---|
| CN | 101871978 A | 10/2010 |
| CN | 102083090 A | 6/2011 |
| CN | 102694607 A | 9/2012 |
| WO | 03090037 A2 | 10/2003 |

OTHER PUBLICATIONS

Partial English Translation and Abstract of Chinese Patent Application No. CN102083090A, Apr. 24, 2015, 6 pages.
Partial English Translation and Abstract of Chinese Patent Application No. CN101871978A, Part 1, Apr. 24, 2015, 4 pages.
Partial English Translation and Abstract of Chinese Patent Application No. CN101871978A, Part 2, Apr. 24, 2015, 3 pages.
Foreign Communication From a Counterpart Application, PCT Application No. PCT/CN2012/083718, English Translation of International Search Report dated Aug. 8, 2013, 2 pages.
Foreign Communication From a Counterpart Application, PCT Application No. PCT/CN2012/083718, English Translation of Written Opinion dated Aug. 8, 2013, 10 pages.

* cited by examiner

METHOD, DEVICE AND SYSTEM FOR COLLECTING AND IDENTIFYING INTERFERENCE

CROSS-REFERENCE TO RELATED APPLICATION

This application is a continuation of International Application No. PCT/CN2012/083718, filed on Oct. 30, 2012, which is hereby incorporated by reference in its entirety.

TECHNICAL FIELD

The present invention relates to the field of wireless communications, and in particular, to a method, a device and a system for collecting and identifying interference.

BACKGROUND

With the development of wireless communications technologies and the increasing popularization and rapid growth of wireless-fidelity (WIFI) devices, applications of wireless local area networks (WLAN) develop rapidly. The deployment and development of multiple types of WLANs, including WLANs for individuals and families, for offices of enterprise zones, and for educational and medical institutions, expand the demand for basic wireless networks, and also bring in the demand for WLAN services and the demand for improvement of user experience. However, some new problems are also caused, and particularly, widespread use of incompatible wireless devices or wireless devices with poor compatibility seriously interferes with the WLAN environment. Interference affects throughput between a wireless access point and a client, and even causes interruption of a client service. When the interference affects a normal service in the WLAN environment, it becomes exceedingly important to avoid and reduce the impact of the interference as soon as possible by obtaining location information of an interfering device rapidly and accurately. To locate interference, interference source information needs to be acquired at multiple detection points, so as to determine the location of the interference using a certain method. After interfering signals are detected at multiple detection points, how to determine that the interfering signals detected at the multiple detection points are sent by a same interference source is a key problem that needs to be solved by a wireless location technology.

In an existing technology for detecting and identifying a same interference source using multiple access point devices, after an interference source sends an interfering signal, each access point device receives, collects, and analyzes the interfering signal. Various types of characteristic information obtained after the signal is analyzed are referred to as a pseudo media access control (MAC) address (PMAC). The PMAC includes spectrum information and some other information, where the spectrum information includes a central frequency, a bandwidth, a pulse period, and the like, and other information includes a device identity, a simulation characteristic, and the like. The device identity cannot be acquired until data is decoded. Then, each access point device reports PMAC data of an interference source to a wireless access controller (AC), and the wireless controller compares the PMAC data according to a preset rule, and groups similar PMAC data into one cluster. Multiple groups of PMAC data reported in a period of time are compared, and after cluster combination or segmentation, PMAC data of each cluster may be finally identified as coming from a same interference source.

The foregoing method for identifying a same interference source solves, to some extent, the problem of identifying an interference source; however, the foregoing method also has some problems. In one aspect, PMAC generation is complex, which not only needs spectrum analysis, but also needs data decoding, and the like, resulting in a high requirement for a detection device; and in the other aspect, because the wireless environment is complex, it is difficult to ensure the accuracy of the PMAC generated according to spectrum information.

SUMMARY

In view of this, the present invention provides a method, a device and a system for collecting and identifying interference, which are used to solve the problems in the prior art that a method for identifying interference of an interference source in a wireless network is complex and has low identification accuracy.

According to a first aspect, the present invention provides a method for identifying interference, which is applied to a wireless communications network that includes a wireless management device and at least two access point devices, where the method for identifying interference includes requesting the at least two access point devices to separately collect spectrum information of an interference source; receiving, from each of the at least two access point devices, collected spectrum information of an interference source, and determining that the spectrum information collected by the at least two access point devices includes spectrum information of interference sources that belong to a same device type; separately extracting, from the spectrum information collected by the at least two access point devices, the spectrum information of the interference sources that belong to the same device type; matching characteristic sequences that are in a same time period and in the separately extracted spectrum information of the interference sources that belong to the same device type, and calculating a match value of the characteristic sequences in the same time period; and determining whether the match value is greater than a preset threshold, and if the match value is greater than the preset threshold, determining that the separately extracted spectrum information of the interference sources that belong to the same device type is from a same interference source, and if the match value is not greater than the preset threshold, determining that the separately extracted spectrum information of the interference sources that belong to the same device type is from different interference sources.

In a first possible implementation manner of the first aspect, the requesting the at least two access point devices to separately collect spectrum information of an interference source includes sending a channel switch request message that includes a specified channel to each access point device in the at least two access point devices, and instructing the at least two access point devices to switch to the specified channel; receiving a channel switch response message returned by each access point device in the at least two access point devices; and determining a master access point device in the at least two access point devices, determining each access point device in the at least two access point devices except the master access point device as a slave access point device, sending a spectrum scan request message to the master access point device, and requesting the master access point device to send, to each slave access point device, a spectrum scan request message that carries information about a scan start time.

The determining a master access point device in the at least two access point devices, and determining each access point device in the at least two access point devices except the master access point device as a slave access point device includes comparing interference values reported by all access point devices in the at least two access point devices, and selecting an access point device with a maximum interference value as the master access point device, and every other access point device as a slave access point device.

The requesting the master access point device to send, to each slave access point device, a spectrum scan request message that carries information about a scan start time includes requesting the master access point device to send, to each slave access point device using a broadcast frame, the spectrum scan request message that carries the information about the scan start time; or presetting the master access point device and each slave access point device as a multicast group or pre-configuring a multicast address, and requesting the master access point device to send, to each slave access point device using a multicast frame, the spectrum scan request message that carries the information about the scan start time.

In a second possible implementation manner of the first aspect, the requesting the at least two access point devices to separately collect spectrum information of an interference source includes sending a channel switch request message that includes a specified channel to each access point device in the at least two access point devices, and instructing the at least two access point devices to switch to the specified channel; receiving a channel switch response message returned by each access point device in the at least two access point devices; and sending a spectrum scan request message to each access point device in the at least two access point devices, where the spectrum scan request message includes a scan start timestamp, so that each access point device in the at least two access point devices starts spectrum scanning according to the scan start timestamp, and collects spectrum information of an interference source.

Before the sending a spectrum scan request message to each access point device in the at least two access point devices, the method further includes determining whether response time of the at least two access point devices is synchronous, where if the response time of the at least two access point devices is synchronous, the spectrum scan request message sent to each access point device in the at least two access point devices includes a same scan start timestamp, and if the response time of the at least two access point devices is not synchronous, the spectrum scan request message sent to each access point device in the at least two access point devices includes a different scan start timestamp.

In the method for identifying interference of the present invention, the spectrum information includes one or more of fast Fourier transform (FFT) data, a start time and an end time, and a sampling time; the characteristic sequence is a spectrum characteristic of the interference source in a time period, and includes one or more types of a central frequency, a bandwidth, a pulse fingerprint, and a duty cycle; the match value is a ratio or a positive integer; and the preset threshold is a ratio or a positive integer.

According to a second aspect, the present invention further provides a method for collecting interference, which is applied to a wireless communications network that includes a wireless management device and at least two access point devices, where the method for collecting interference includes collecting spectrum information of an interference source according to a request of the wireless management device; and sending the collected spectrum information of the interference source to the wireless management device.

In a first possible implementation manner of the second aspect, the collecting spectrum information of an interference source according to a request of the wireless management device includes receiving a channel switch request message that is sent by the wireless management device and includes a specified channel, switching to the specified channel, and returning a channel switch response message to the wireless management device; and presetting a scan start time after receiving a spectrum scan request message sent by the wireless management device, sending, to another access point device, a spectrum scan request message that carries information about the scan start time, starting spectrum scanning according to the scan start time, and collecting spectrum information of an interference source.

The sending, to another access point device, a spectrum scan request message that carries information about the scan start time is sending, to the other access point device using a broadcast frame or a multicast frame, the spectrum scan request message that carries the information about the scan start time.

In a second possible implementation manner of the second aspect, the collecting spectrum information of an interference source according to a request of the wireless management device includes after receiving a channel switch request message that is sent by the wireless management device and includes a specified channel, switching to the specified channel, and returning a channel switch response message to the wireless management device; and receiving a spectrum scan request message that is sent by the wireless management device and includes a scan start timestamp, starting spectrum scanning according to the scan start timestamp, and collecting spectrum information of an interference source.

According to a third aspect, the present invention further provides a wireless management device, including a requesting module configured to send, to at least two access point devices separately, a request for collecting spectrum information of an interference source; an extraction module configured to receive, from each of the at least two access point devices, collected spectrum information of an interference source, and when it is determined that the spectrum information collected by the at least two access point devices includes spectrum information of interference sources that belong to a same device type, separately extract, from the spectrum information collected by the at least two access point devices, the spectrum information of the interference sources that belong to the same device type; a matching module configured to match characteristic sequences that are in a same time period and in the separately extracted spectrum information of the interference sources that belong to the same device type, and calculate a match value of the characteristic sequences in the same time period; and an identification module configured to determine whether the match value is greater than a preset threshold, and if the match value is greater than the preset threshold, determine that the separately extracted spectrum information of the interference sources that belong to the same device type is from a same interference source, and if the match value is not greater than the preset threshold, determine that the separately extracted spectrum information of the interference sources that belong to the same device type is from different interference sources.

In a first possible implementation manner of the third aspect, the requesting module includes a channel switching unit configured to send a channel switch request message that includes a specified channel to the at least two access point devices, instruct the at least two access point devices to switch to the specified channel, and receive a channel switch response message returned by each access point device in the at least two access point devices; and a scan requesting unit configured to determine a master access point device in the at least two access point devices, determine each access point device in the at least two access point devices except the master access point device as a slave access point device, send a spectrum scan request message to the master access point device, and request the master access point device to send, to each slave access point device, a spectrum scan request message that carries information about a scan start time.

That the scan requesting unit determines a master access point device in the at least two access point devices, and determines each access point device in the at least two access point devices except the master access point device as a slave access point device includes comparing interference values reported by all access point devices in the at least two access point devices, and selecting an access point device with a maximum interference value as the master access point device, and every other access point device as a slave access point device.

That the scan requesting unit requests the master access point device to send, to each slave access point device, a spectrum scan request message that carries information about a scan start time includes requesting the master access point device to send, to each slave access point device using a broadcast frame, the spectrum scan request message that carries the information about the scan start time, or presetting, by the scan requesting unit, the master access point device and each slave access point device as a multicast group or pre-configuring a multicast address, and requesting the master access point device to send, to each slave access point device using a multicast frame, the spectrum scan request message that carries the information about the scan start time.

In a second possible implementation manner of the third aspect, the requesting module includes a channel switching unit configured to send a channel switch request message that includes a specified channel to each access point device in the at least two access point devices, instruct the at least two access point devices to switch to the specified channel, and receive a channel switch response message returned by each access point device in the at least two access point devices; and a scan requesting unit configured to send a spectrum scan request message to each access point device in the at least two access point devices, where the spectrum scan request message includes a scan start timestamp, so that each access point device in the at least two access point devices starts spectrum scanning according to the scan start timestamp, and collects spectrum information of an interference source.

The scan requesting unit is further configured to determine whether response time of the at least two access point devices is synchronous, where if the response time of the at least two access point devices is synchronous, the spectrum scan request message sent to each access point device in the at least two access point devices includes a same scan start timestamp, and if the response time of the at least two access point devices is not synchronous, the spectrum scan request message sent to each access point device in the at least two access point devices includes a different scan start timestamp.

In the wireless management device of the present invention, the spectrum information includes one or more of FFT data, a start time and an end time, and a sampling time; the characteristic sequence is a spectrum characteristic of the interference source in a time period, and includes one or more types of a central frequency, a bandwidth, a pulse fingerprint, and a duty cycle; the match value is a ratio or a positive integer; and the preset threshold is a ratio or a positive integer.

According to a fourth aspect, the present invention further provides an access point device, including a collecting module configured to collect spectrum information of an interference source according to a request of a wireless management device; and a sending module configured to send, to the wireless management device, the spectrum information of the interference source collected by the collecting module.

In a first possible implementation manner of the fourth aspect, the collecting module is configured to receive a channel switch request message that is sent by the wireless management device and includes a specified channel, and switch to the specified channel; receive a spectrum scan request message sent by the wireless management device, preset a scan start time, send, to another access point device, a spectrum scan request message that carries information about the scan start time, start spectrum scanning according to the scan start time, and collect spectrum information of an interference source.

The collecting module sends, to the other access point device using a broadcast frame or a multicast frame, the spectrum scan request message that carries the information about the scan start time.

In a second possible implementation manner of the fourth aspect, the collecting module is configured to receive a channel switch request message that is sent by the wireless management device and includes a specified channel, and switch to the specified channel; receive a spectrum scan request message that is sent by the wireless management device and includes a scan start timestamp, start spectrum scanning according to the scan start timestamp, and collect spectrum information of an interference source.

According to a fifth aspect, the present invention provides a system for collecting and identifying interference, including the wireless management device according to the third aspect or any one of the possible implementation manners of the third aspect, and at least two access point devices, where the at least two access point devices are configured to collect spectrum information of an interference source, and send the collected spectrum information of the interference source to the wireless management device.

As described above, the method, the device, and the system for identifying interference according to the present invention have the following beneficial effects:

In the present invention, a manner of matching overlapping characteristics is used, which has high accuracy in identifying an interference source, and the solution is simple and easy to implement. In addition, a normal wireless access service is not affected in an identification process. Because collection time of all access point devices is almost synchronous, the problem in the prior art that an identification result is inaccurate because of inconsistent collection time of the access point devices and a great difference between signal characteristics in different time periods is further solved.

DESCRIPTION OF EMBODIMENTS

Figure 1:
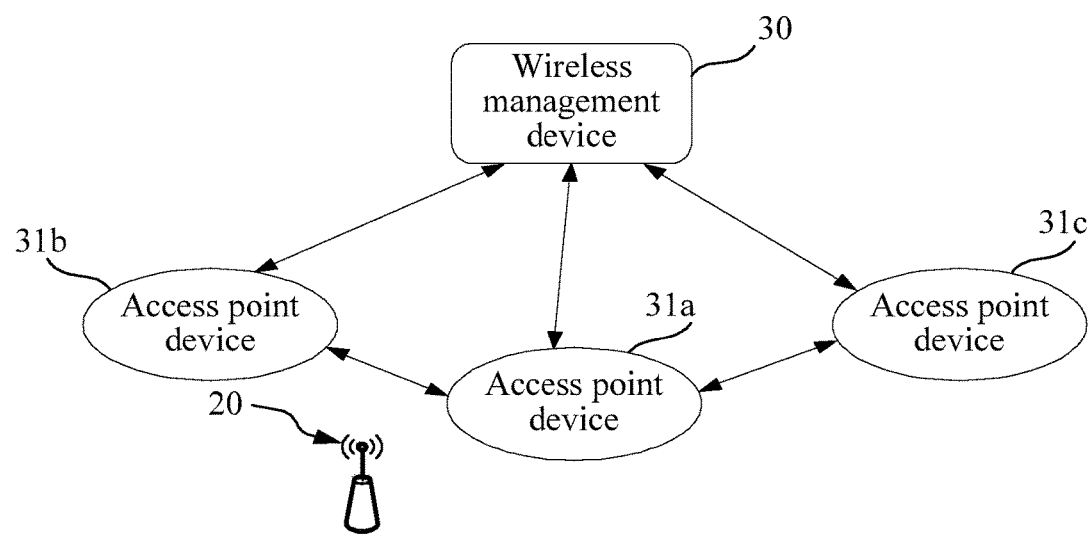
FIG. 1 is a schematic structural diagram of a system for collecting and identifying interference according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

It should be noted that, the drawings provided in the embodiments merely describe the basic concept of the present invention in an exemplary manner. Therefore, the drawings merely show components related to the present invention, but are not drawn according to the quantities, the shapes, and the sizes of the components during actual implementation. During actual implementation, the shapes, the quantities, and the proportions of the components may be changed randomly, and the layout of the components may also be more complex.

The method, device, and system for collecting and identifying interference provided in the present invention are applied to a wireless communications network that includes a wireless management device and at least two access point devices. The wireless management device is configured to control each of the at least two access point devices to collect spectrum information of an interference source, so as to determine interference sources of spectrum information that is collected by the at least two access point devices and belongs to a same interference type, and extract, from the spectrum information collected by the at least two access point devices, the spectrum information that belongs to the same interference type; match characteristic sequences of the interference sources, and calculate an overlapping characteristic match value, so as to determine whether the match value is greater than a preset threshold, and if the match value is greater than the preset threshold, determine that the extracted spectrum information is from a same interference source, and if the match value is not greater than the preset threshold, determine that the extracted spectrum information is from different interference sources, thereby implementing interference identification. The wireless management device may be a wireless controller AC, or a network management device, or an interference identification device used for spectrum analysis. If the wireless management device is a network management device or an interference identification device used for spectrum analysis, the wireless management device may directly deliver a command to each access point device, or may deliver a command to each access point device using an AC, so that the access point device collects spectrum information of an interference source. The at least two access point devices are configured to collect spectrum information of an interference source, and may be a wireless router, a wireless gateway, or a wireless switch.

The interference source is an interference device to be detected and identified, or may be a standard device conforming to a WLAN standard protocol, such as a WIFI terminal or BLUETOOTH, or may be a device not conforming to a WLAN standard protocol, such as a microwave oven, a simulation device, or a cordless telephone using a dedicated protocol.

In the method, the device, and the system for collecting and identifying interference provided in the present invention, a manner of matching overlapping characteristics is used, which has high accuracy in identifying an interference source, and the solution is simple and easy to implement.

FIG. 1 illustrates a schematic structural diagram of a system for collecting and identifying interference according to an embodiment of the present invention. As shown in FIG. 1, the system for collecting and identifying interference includes a wireless management device 30, three access point devices 31a, 31b, and 31c, and an interference source 20.

The three access point devices 31a, 31b, and 31c are configured to collect spectrum information of an interference source.

The wireless management device 30 is configured to request the three access point devices 31a, 31b, and 31c to separately collect spectrum information of an interference source; determine whether the three access point devices 31a, 31b, and 31c collect spectrum information of interference sources that belong to a same device type; when it is determined that the spectrum information collected by the three access point devices 31a, 31b, and 31c includes spectrum information of the interference sources that belong to the same device type, separately extract, from the spectrum information collected by the three access point devices 31a, 31b, and 31c, spectrum information of the interference sources that belong to the same device type, match characteristic sequences that are in a same time period and in the separately extracted spectrum information of the interference sources that belong to the same device type, calculate an overlapping characteristic match value of the characteristic sequences in the same time period, and determine whether the overlapping characteristic match value is greater than a preset threshold; and if the overlapping characteristic match value is greater than the preset threshold, determine that the separately extracted spectrum information of the interference sources that belong to the same device type is from a same interference source, and if the overlapping characteristic match value is not greater than the preset threshold, determine that the separately extracted spectrum information of the interference sources that belong to the same device type are from different interference sources.

It should be noted that, the architecture of the system for collecting and identifying interference shown in FIG. 1 is merely schematic, and an actual network system may only include two access point devices, or may include more access point devices besides the three access point devices 31a, 31b, and 31c; and may only include one interference source 20, or may include two or even more interference sources.

Figure 2:
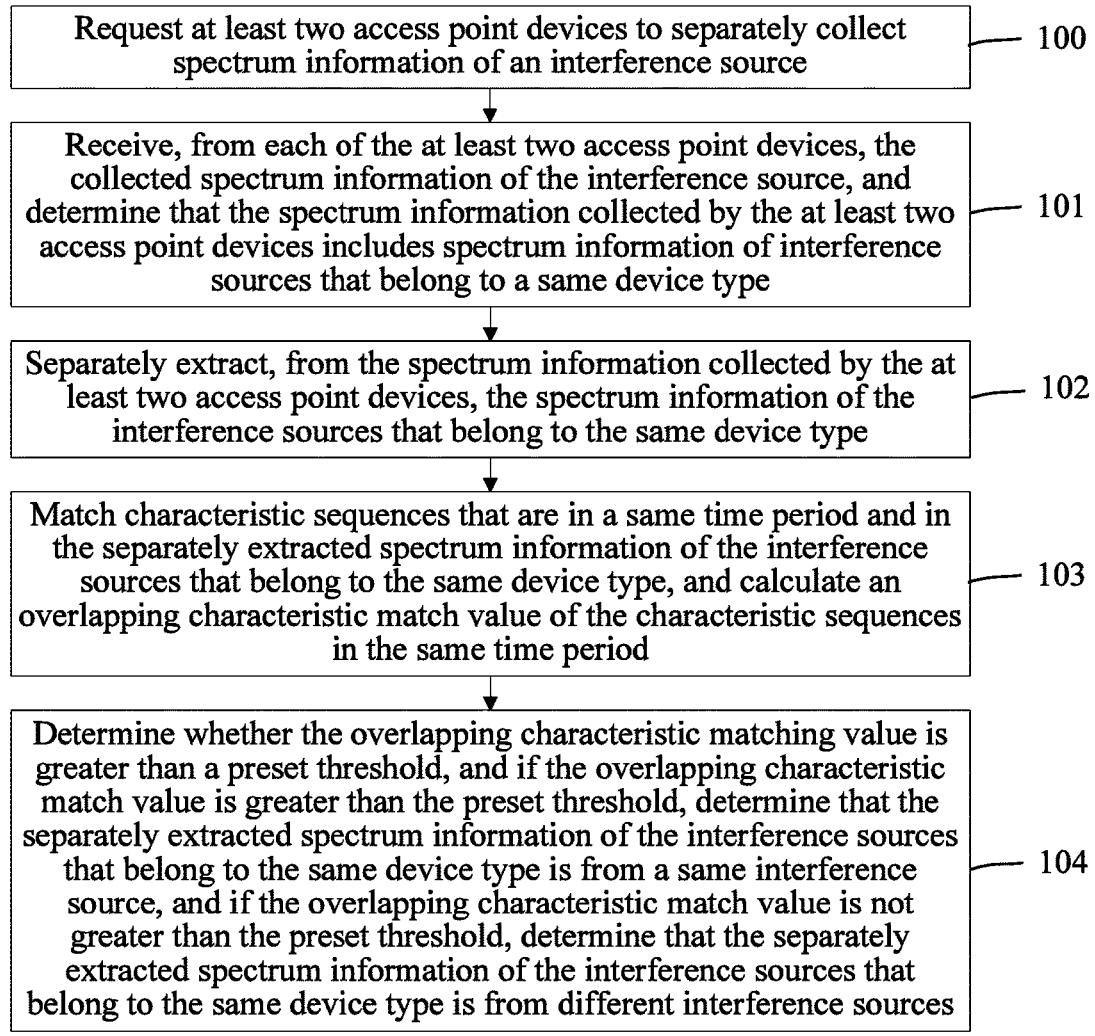
FIG. 2 is a schematic flowchart of a method for identifying interference according to an embodiment of the present invention.

FIG. 2 illustrates a schematic flowchart of a method for identifying interference according to an embodiment of the present invention. The method is applied to a wireless communications network that includes a wireless management device and at least two access point devices, for example, the system shown in FIG. 1. As shown in FIG. 2, the method for identifying interference includes the following steps.

100: Request the at least two access point devices to separately collect spectrum information of an interference source.

In this embodiment, the wireless management device requests the at least two access point devices to separately collect spectrum information of an interference source. The wireless management device may collect spectrum information of an interference source by means of centralized control over the at least two access point devices, that is, directly send a request to each access point device; the wireless management device may also collect spectrum information of an interference source by means of master-slave control over the at least two access point devices, that is, determine a master access point device in the at least two access point devices, send a request to the master access point device, and then send the request to each slave access point device using the master access point device. In the system shown in FIG. 1, the wireless management device 30 requests the three access point devices 31a, 31b, and 31c to collect spectrum information of the interference source 20.

101: Receive, from each of the at least two access point devices, collected spectrum information of an interference source, and determine that the spectrum information collected by the at least two access point devices includes spectrum information of interference sources that belong to a same device type.

In this embodiment, the wireless management device determines whether the at least two access point devices collect spectrum information of interference sources that belong to a same device type, so as to determine that the spectrum information collected by the at least two access point devices includes the spectrum information of the interference sources that belong to the same device type. In the system shown in FIG. 1, the wireless management device 30 determines whether the three access point devices 31a, 31b, and 31c collect spectrum information of interference sources that belong to a same device type, so as to determine that the spectrum information collected by the three access point devices 31a, 31b, and 31c includes the spectrum information of the interference sources that belong to the same device type.

102: Separately extract, from the spectrum information collected by the at least two access point devices, the spectrum information of the interference sources that belong to the same device type.

In this embodiment, the wireless management device separately extracts, from the spectrum information collected by the at least two access point devices, the spectrum information of the interference sources that belong to the same device type. In the system shown in FIG. 1, the wireless management device 30 separately extracts, from the spectrum information collected by the three access point devices 31a, 31b, and 31c, the spectrum information of the interference sources that belong to the same device type. The spectrum information includes one or more of FFT data, a start time and an end time, and a sampling time.

103: Match characteristic sequences that are in a same time period and in the separately extracted spectrum information of the interference sources that belong to the same device type, and calculate an overlapping characteristic match value of the characteristic sequences in the same time period.

In this embodiment, the wireless management device matches characteristic sequences that are in a same time period and in the separately extracted spectrum information of the interference sources that belong to the same device type, and calculates an overlapping characteristic match value of the characteristic sequences in the same time period.

The characteristic sequence may be construed as a spectrum characteristic of an interference source in a time period, which includes one or more characteristics of types of a central frequency, a bandwidth, a pulse fingerprint, and a duty cycle.

104: Determine whether the overlapping characteristic match value is greater than a preset threshold, and if the overlapping characteristic match value is greater than the preset threshold, determine that the separately extracted spectrum information of the interference sources that belong to the same device type is from a same interference source, and if the overlapping characteristic match value is not greater than the preset threshold, determine that the separately extracted spectrum information of the interference sources that belong to the same device type is from different interference sources.

In this embodiment, the wireless management device determines whether the calculated overlapping characteristic match value is greater than a preset threshold, and if the overlapping characteristic match value is greater than the preset threshold, determines that the separately extracted spectrum information of the interference sources that belong to the same device type is from a same interference source, and if the overlapping characteristic match value is not greater than the preset threshold, determines that the separately extracted spectrum information of the interference sources that belong to the same device type is from different interference sources.

Figure 3:
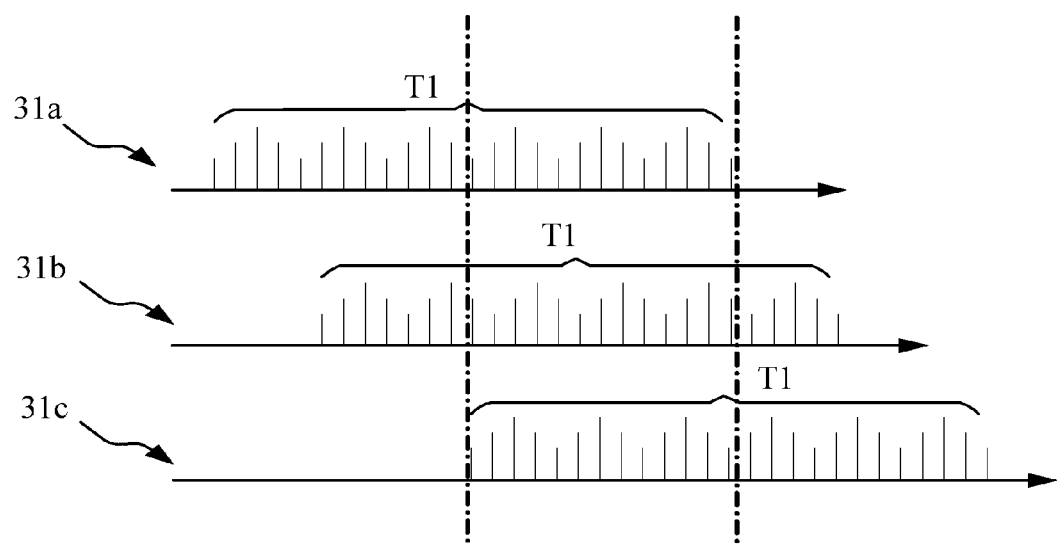
FIG. 3 is a schematic principle diagram of overlapping characteristics according to an embodiment of the present invention.

The overlapping characteristics are identical or similar characteristics in characteristic sequences that are in a same time period and in spectrum information, which is separately extracted by at least two access point devices, of interference sources that belong to a same device type. FIG. 3 illustrates a schematic principle diagram of overlapping characteristics according to an embodiment of the present invention. The three access point devices 31a, 31b, and 31c in the system shown in FIG. 1 are used as an example to describe how to identify overlapping characteristics. As shown in FIG. 3, characteristic sequences that are in a same time period, that is, T1, and in a total of three groups of spectrum information of the three access point devices 31a, 31b, and 31c are matched to calculate an overlapping characteristic match value.

The overlapping characteristic match value is a ratio or a positive integer. The overlapping characteristic match value is a ratio of spectrum information of an overlapping characteristic to all spectrum information of an interference source, that is, a ratio of spectrum information, which is separately extracted by at least two access point devices, of characteristic sequences in a same time period and in spectrum information of interference sources that belong to a same device type to all spectrum information of the interference source. Correspondingly, the preset threshold used for determining is a ratio, and the corresponding preset threshold may be set according to an empirical value, for example, 0.5. Alternatively, the overlapping characteristic match value is the number of overlapping characteristics, that is, the number of identical characteristics in consecutive two or more than two characteristic sequences in spectrum information extracted by one access point device and in characteristic sequences in spectrum information extracted by another access point device, where the spectrum information extracted by the access point devices is spectrum information of interference sources that belong to a same device type. Correspondingly, the preset threshold used for determining is an integer, for example, the corresponding threshold is set according to an empirical value, for example, 5.

In the system shown in FIG. 1, for example, the interference source 20 is Bluetooth; an overlapping characteristic match value is a ratio of spectrum information of an overlapping characteristic to all spectrum information of the interference source 20; a preset threshold for determining is 0.5; the wireless management device 30 matches characteristic sequences that are in a same time period and in a total of three groups of spectrum information of the access point devices 31a, 31b, and 31c; the calculated overlapping characteristic match value is 0.7, and therefore, it is determined that the match value is greater than the preset threshold 0.5, and it is determined that the separately extracted spectrum information of the interference sources that belong to the same device type is from a same interference source. In other words, if the wireless management device 30 matches the characteristic sequences that are in the same time period and in the total of three groups of spectrum information of the access point devices 31a, 31b, and 31c, and the calculated overlapping characteristic match value is 0.3, it is determined that the match value is not greater than the preset threshold 0.5, and it is determined that the separately extracted spectrum information of the interference sources that belong to the same device type is from different interference sources.

In the method for identifying interference provided in this embodiment, by matching overlapping characteristics in characteristic sequences that are in a same time period and in spectrum information, which is separately extracted by at least two access point devices, of interference sources that belong to a same device type, the accuracy for identifying an interference source is high, thereby solving the problem in the prior art that a method for identifying an interference source in a wireless network is complex and has low identification accuracy.

Figure 4:
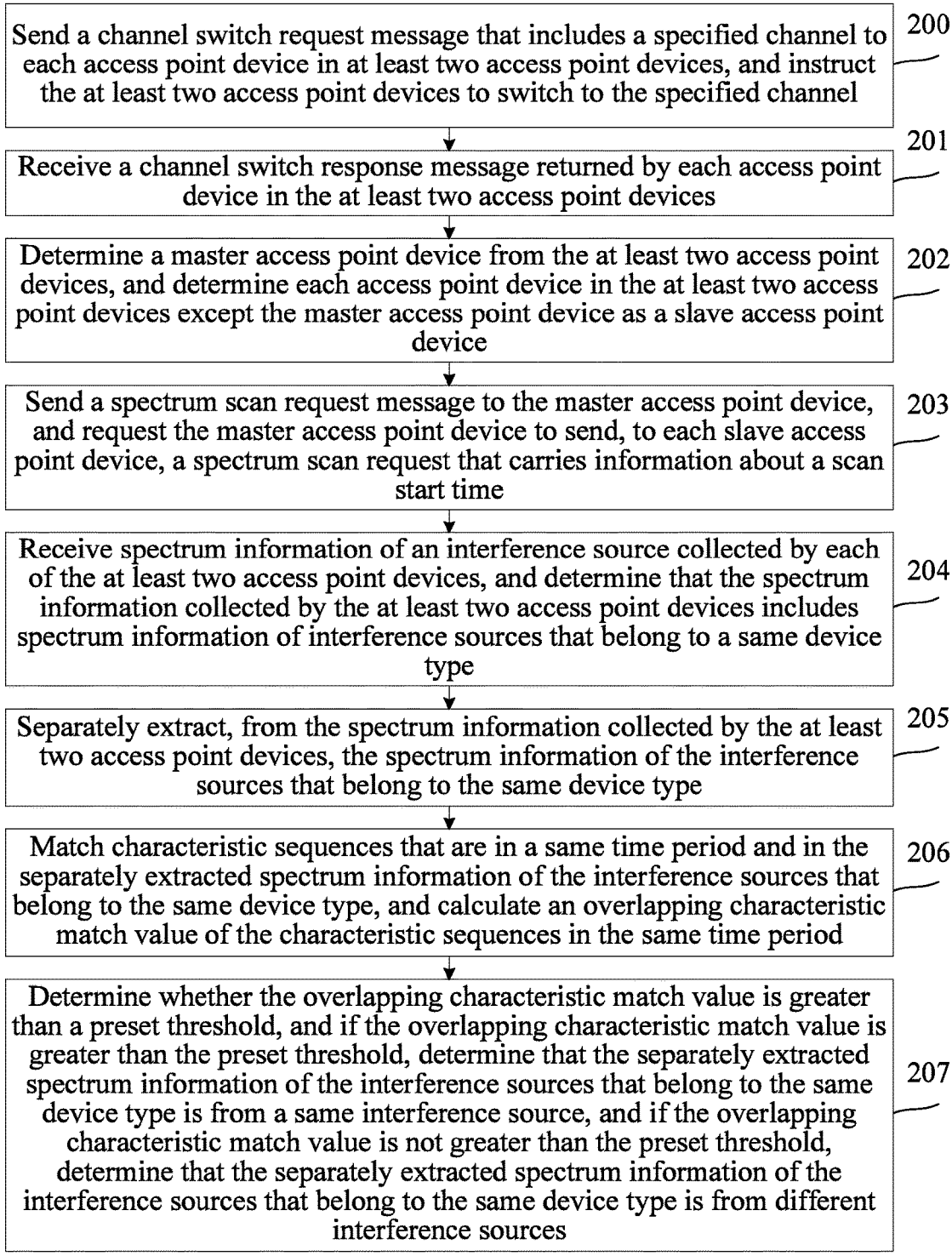
FIG. 4 is a schematic flowchart of another method for identifying interference according to an embodiment of the present invention.

Refer to FIG. 4, which is a schematic flowchart of another method for identifying interference according to an embodiment of the present invention. It should be particularly noted that, in this embodiment of the identification method, on the basis of the method for identifying interference shown in FIG. 2, only a method for identifying interference that uses scanning under master-slave control in step 100 is further introduced. As shown in FIG. 4, the method includes the following steps.

200: Send a channel switch request message that includes a specified channel to each access point device in the at least two access point devices, and instruct the at least two access point devices to switch to the specified channel. In this embodiment, a wireless management device sends a channel switch request message that includes a specified channel to the at least two access point devices, and instructs the at least two access point devices to switch to the specified channel. In the system shown in FIG. 1, the wireless management device 30 sends a channel switch request message that includes a specified channel to each access point device in the three access point devices 31a, 31b, and 31c, and instructs each access point device in the three access point devices 31a, 31b, and 31c to switch to the specified channel. It should be noted that, the specified channel carried in the channel switch request message sent by the wireless management device 30 to each access point device in the three access point devices 31a, 31b, and 31c is a particular band, so that the three access point devices 31a, 31b, and 31c separately switch to the particular band, thereby ensuring that the three access point devices 31a, 31b, and 31c communicate with the wireless management device 30 in the same channel.

201: Receive a channel switch response message returned by each access point device in the at least two access point devices. In this embodiment, after the at least two access point devices switch to the specified channel, the wireless management device receives a channel switch response message replied by each of the at least two access point devices, and makes an acknowledgment. In the system shown in FIG. 1, after switching to the specified channel, the three access point devices 31a, 31b, and 31c each reply a channel switch response message to the wireless management device 30, and then the wireless management device 30 replies an acknowledgment message to the three access point devices 31a, 31b, and 31c.

202: Determine a master access point device in the at least two access point devices, and determine each access point device in the at least two access point devices except the master access point device as a slave access point device. In this embodiment, the wireless management device determines a master access point device in the at least two access point devices, and every other access point device, that is, each access point device in the at least two access point devices except the master access point device, as a slave access point device.

The wireless management device may compare interference values reported by all access point devices in the at least two access point devices, select an access point device with a maximum interference value as the master access point device, and every other access point device, that is, each access point device in the at least two access point devices except the master access point device, as a slave access point device, mark the master access point device, and send mark information to the master access point device.

In other words, the wireless management device determines the master access point device according to an interference degree.

In the system shown in FIG. 1, the wireless management device 30 determines, from the three access point devices 31a, 31b, and 31c according to an interference degree, the access point device 31a as a master access point device, and the other two access point devices 31b and 31c as slave access point devices; and then the wireless management device 30 sends a spectrum scan request to the master access point device 31a.

203: Send a spectrum scan request message to the master access point device, and request the master access point device to send, to each slave access point device, a spectrum scan request message that carries information about a scan start time. In this embodiment, the wireless management device sends a spectrum scan request message to the master access point device, and requests the master access point device to send, to each slave access point device, a spectrum scan request message that carries information of a scan start time, and optionally, the wireless management device receives a spectrum scan response message replied by the master access point device. After receiving the spectrum scan request message sent by the wireless management device, the master access point device presets the scan start time, and then sends, to each slave access point device, a spectrum scan request message that carries information about the scan start time. The scan start time is a relative time. The master access point device starts scanning after the scan start time which is started when the spectrum scan request is sent to each slave access point device, and each slave access point device starts scanning after the scan start time which is started when the spectrum scan request of the master access point device is received. Basically, it can be ensured that the master access point device and each slave access point device start scanning at the same time, thereby scanning pulse signals in a same time period.

In the system shown in FIG. 1, the wireless management device 30 sends a spectrum scan request message to the master access point device 31a, and requests the master access point device 31a to send, to the two slave access point devices 31b and 31c, a spectrum scan request message that carries the information about the scan start time.

In an actual execution process, after receiving a spectrum scan request, the master access point device 31a replies a spectrum scan response message; the master access point device 31a does not start scanning immediately but presets a scan start time, for example, t1, and then according to the scan start time, starts scanning after sending the spectrum scan request and waiting the scan start time t1. Meanwhile, the master access point device 31a sends, to the two slave access point devices 31b and 31c, the spectrum scan request message that carries the scan start time t1. After receiving the request, the two slave access point devices 31b and 31c set timing, and start scanning after receiving the spectrum scan request and waiting the scan start time t1. A message between the master access point device 31a and the slave access point devices 31b and 31c is transmitted using radio electromagnetic waves, where a difference between times when the message arrives at the two slave access point devices 31b and 31c is nanosecond-level and can be ignored compared with a millisecond level required by the spectrum scanning. Therefore, basically, it can be ensured that the three access point devices 31a, 31b, and 31c start scanning at the same time, thereby scanning pulse signals in a same time period.

The sending a spectrum scan request to the master access point device may be implemented in two manners. One is that the wireless management device requests the master access point device to send, to each slave access point device using a broadcast frame, the spectrum scan request message that carries the information about the scan start time; and the other manner is that the wireless management device sends the spectrum scan request to the master access point device, which includes presetting the master access point device and each slave access point device as a multicast group or pre-configuring a multicast address, and requesting the master access point device to send, to each slave access point device using a multicast frame, the spectrum scan request message that carries the information about the scan start time.

204: Receive spectrum information of an interference source collected by each of the at least two access point devices, and determine that the spectrum information collected by the at least two access point devices includes spectrum information of interference sources that belong to a same device type.

In this embodiment, the wireless management device receives spectrum information of interference sources, which is collected by the at least two access point devices, that is, the master access point device and each slave access point device, after starting spectrum scanning according to the scan start time; and determines whether the spectrum information of the interference sources collected by the master access point device and each slave access point device includes spectrum information of interference sources that belong to a same device type. Refer to 101 for details, which are not described again herein.

205: Separately extract, from the spectrum information collected by the at least two access point devices, the spectrum information of the interference sources that belong to the same device type.

In this embodiment, the wireless management device separately extracts, from the spectrum information collected by the at least two access point devices, the spectrum information of the interference sources that belong to the same device type. Refer to 102 for details, which are not described again herein.

206: Match characteristic sequences that are in a same time period and in the separately extracted spectrum information of the interference sources that belong to the same device type, and calculate an overlapping characteristic match value of the characteristic sequences in the same time period.

In this embodiment, the wireless management device matches characteristic sequences that are in a same time period and in the separately extracted spectrum information of the interference sources that belong to the same device type, and calculates an overlapping characteristic match value of the characteristic sequences in the same time period. The characteristic sequence may be construed as a spectrum characteristic of an interference source in a time period, which includes one or more characteristics of types of a central frequency, a bandwidth, a pulse fingerprint, and a duty cycle. Refer to 103 for details, which are not described again herein.

207: Determine whether the overlapping characteristic match value is greater than a preset threshold, and if the overlapping characteristic match value is greater than the preset threshold, determine that the separately extracted spectrum information of the interference sources that belong to the same device type is from a same interference source, and if the overlapping characteristic match value is not greater than the preset threshold, determine that the separately extracted spectrum information of the interference sources that belong to the same device type is from different interference sources.

In this embodiment, the wireless management device determines whether the calculated overlapping characteristic match value is greater than a preset threshold, and if the overlapping characteristic match value is greater than the preset threshold, determines that the separately extracted spectrum information of the interference sources that belong to the same device type is from a same interference source, and if the overlapping characteristic match value is not greater than the preset threshold, determines that the separately extracted spectrum information of the interference sources that belong to the same device type is from different interference sources. Refer to 104 for details, which are not described again herein.

In the method for identifying interference provided in this embodiment, a wireless management device determines a master access point device, and uses a master-slave control scan manner, that is, the master access point device controls a slave access point device to start spectrum scanning at a preset scan start time, so as to ensure that all access point devices can acquire interference characteristics in an overlapping time range, thereby further ensuring that the access point devices scan pulse signals in a same time period. Based on an air interface relative time and without relying on time synchronization between access point devices, overlapping characteristics are obtained by means of spectrum scanning under master-slave control; the solution is simple and easy to implement, and has high identification accuracy.

Figure 5:
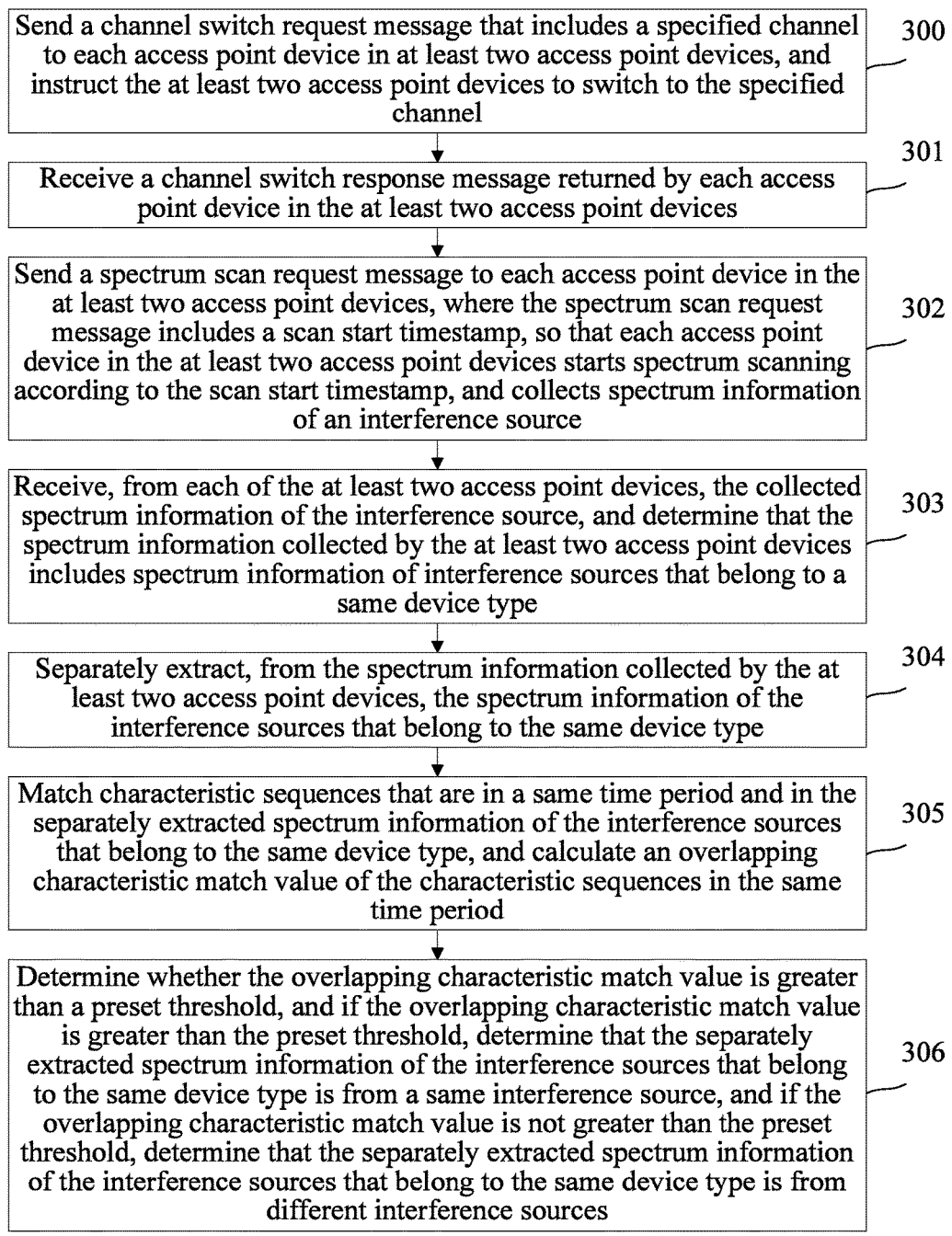
FIG. 5 is a schematic flowchart of still another method for identifying interference according to an embodiment of the present invention.

FIG. 5 illustrates a schematic flowchart of still another method for identifying interference according to an embodiment of the present invention. It should be particularly noted that, in this embodiment of the identification method, on the basis of the method for identifying interference shown in FIG. 2, a method for identifying interference that uses scanning under centralized control in step 100 is further introduced. As shown in FIG. 5, the method includes the following steps.

300: Send a channel switch request message that includes a specified channel to each access point device in the at least two access point devices, and instruct the at least two access point devices to switch to the specified channel.

In this embodiment, the wireless management device sends a channel switch request message that includes a specified channel to the at least two access point devices, and instructs the at least two access point devices to switch to the specified channel. In the system shown in FIG. 1, the wireless management device 30 sends a channel switch request message that includes a specified channel to each access point device in the three access point devices 31*a*, 31*b*, and 31*c*, and instructs each access point device in the three access point devices 31*a*, 31*b*, and 31*c* to switch to the specified channel. It should be noted that, the specified channel carried in the channel switch request message sent by the wireless management device 30 to each access point device in the three access point devices 31*a*, 31*b*, and 31*c* is a particular band, so that the three access point devices 31*a*, 31*b*, and 31*c* separately switch to the particular band, thereby ensuring that the three access point devices 31*a*, 31*b*, and 31*c* communicate with the wireless management device 30 in the same channel.

301: Receive a channel switch response message returned by each access point device in the at least two access point devices.

In this embodiment, after the at least two access point devices switch to the specified channel, the wireless management device receives a channel switch response message replied by each of the at least two access point devices, and makes an acknowledgment. In the system shown in FIG. 1, after switching to the specified channel, the three access point devices 31*a*, 31*b*, and 31*c* each reply a channel switch response message to the wireless management device 30, and then the wireless management device 30 replies an acknowledgment message to the three access point devices 31*a*, 31*b*, and 31*c*.

302: Send a spectrum scan request message to each access point device in the at least two access point devices, where the spectrum scan request message includes a scan start timestamp, so that each access point device in the at least two access point devices starts spectrum scanning according to the scan start timestamp, and collects spectrum information of an interference source.

Before the wireless management device sends the spectrum scan request message to each access point device in the at least two access point devices, it needs to determine whether response times of the at least two access point devices are synchronous, where if the response times of the at least two access point devices are synchronous, the spectrum scan request message sent to each access point device in the at least two access point devices includes a same scan start timestamp, and if the response times of the at least two access point devices are not synchronous, the spectrum scan request message sent to each access point device in the at least two access point devices includes a different scan start timestamp.

In the system shown in FIG. 1, before the wireless management device sends the spectrum scan request message to the three access point devices 31*a*, 31*b*, and 31*c*, it needs to determine whether response times of the three access point devices 31*a*, 31*b*, and 31*c* are synchronous, where if the response times of the three access point devices 31*a*, 31*b*, and 31*c* are synchronous, the scan start timestamps included in the spectrum scan request messages sent to the three access point devices 31*a*, 31*b*, and 31*c* are the same, and if the response times of the three access point devices 31*a*, 31*b*, and 31*c* are not synchronous, the scan start timestamps included in the spectrum scan request messages sent to the three access point devices 31*a*, 31*b*, and 31*c* are different.

303: Receive, from each of the at least two access point devices, collected spectrum information of an interference source, and determine that the spectrum information collected by the at least two access point devices includes spectrum information of interference sources that belong to a same device type.

The wireless management device receives, from each of the at least two access point devices, collected spectrum information of an interference source, and determines that the spectrum information collected by the at least two access point devices includes spectrum information of interference sources that belong to a same device type. Refer to 101 for details, which are not described again herein.

304: Separately extract, from the spectrum information collected by the at least two access point devices, the spectrum information of the interference sources that belong to the same device type.

In this embodiment, the wireless management device separately extracts, from the spectrum information collected by the at least two access point devices, the spectrum information of the interference sources that belong to the same device type. Refer to 102 for details, which are not described again herein.

305: Match characteristic sequences that are in a same time period and in the separately extracted spectrum information of the interference sources that belong to the same device type, and calculate an overlapping characteristic match value of the characteristic sequences in the same time period.

In this embodiment, the wireless management device matches characteristic sequences that are in a same time period and in the separately extracted spectrum information of the interference sources that belong to the same device type, and calculates an overlapping characteristic match value of the characteristic sequences in the same time period. The characteristic sequence may be construed as a spectrum characteristic of an interference source in a time period, which includes one or more characteristics of types of a central frequency, a bandwidth, a pulse fingerprint, and a duty cycle. Refer to 103 for details, which are not described again herein.

306: Determine whether the overlapping characteristic match value is greater than a preset threshold, and if the overlapping characteristic match value is greater than the preset threshold, determine that the separately extracted spectrum information of the interference sources that belong to the same device type is from a same interference source, and if the overlapping characteristic match value is not greater than the preset threshold, determine that the separately extracted spectrum information of the interference sources that belong to the same device type is from different interference sources.

In this embodiment, the wireless management device determines whether the calculated overlapping characteristic match value is greater than a preset threshold, and if the overlapping characteristic match value is greater than the preset threshold, determines that the separately extracted spectrum information of the interference sources that belong to the same device type is from a same interference source, and if the overlapping characteristic match value is not greater than the preset threshold, determines that the separately extracted spectrum information of the interference sources that belong to the same device type is from different interference sources. Refer to 104 for details, which are not described again herein.

In the method for identifying interference provided in this embodiment, after a wireless management device sends, in a centralized manner, a spectrum scan request message that includes a scan start timestamp to each access point device in the at least two access point devices, the at least two access point devices start spectrum scanning according to the scan start timestamp, so as to achieve the objective of synchronously collecting spectrum information of interference sources. Because collection times of all access point devices are almost synchronous, the problem in the prior art that an identification result is inaccurate because of inconsistent collection times of the access point devices and a great difference between signal characteristics in different time periods is further solved.

Figure 6:
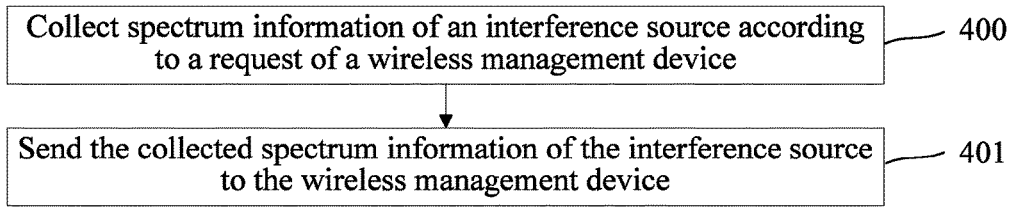
FIG. 6 is a schematic flowchart of a method for collecting interference according to an embodiment of the present invention.

FIG. 6 illustrates a schematic flowchart of a method for collecting interference according to an embodiment of the present invention. The method is applied to a wireless communications network that includes a wireless management device and at least two access point devices, and the wireless communications network may be the system shown in FIG. 1. As shown in FIG. 6, the method for collecting interference includes the following steps.

400: Collect spectrum information of an interference source according to a request of the wireless management device. An access point device collects spectrum information of an interference source according to a request of the wireless management device. In the system shown in FIG. 1, the three access point devices 31a, 31b, and 31c collect spectrum information of the interference source 20 according to a request of the wireless management device 30.

401: Send the collected spectrum information of the interference source to the wireless management device. The access point device sends the collected spectrum information of the interference source to the wireless management device. In the system shown in FIG. 1, the three access point devices 31a, 31b, and 31c separately send the collected spectrum information of the interference source 20 to the wireless management device 30.

Figure 7:
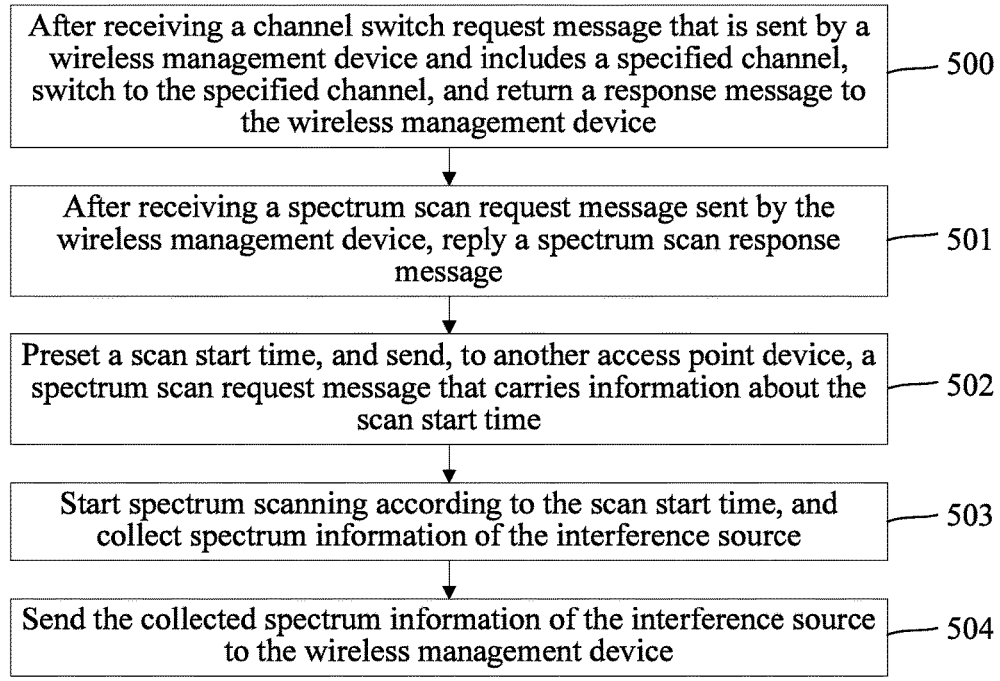
FIG. 7 is a schematic flowchart of another method for collecting interference according to an embodiment of the present invention.

Refer to FIG. 7, which is a schematic flowchart of another method for collecting interference according to an embodiment of the present invention. It should be particularly noted that, in this embodiment of the identification method, on the basis of the method for collecting interference shown in FIG. 6, only a method for collecting interference that uses scanning under master-slave control in step 400 is further introduced. When the scanning under master-slave control is used, the wireless management device determines a master access point device in the at least two access point devices, and determines each access point device in the at least two access point devices except the master access point device as a slave access point device. As shown in FIG. 7, the method includes the following steps.

500: After receiving a channel switch request message that is sent by the wireless management device and includes a specified channel, switch to the specified channel, and return a response message to the wireless management device. After receiving a channel switch request message that is sent by the wireless management device and includes a specified channel, each access point device in the at least two access point devices switches to the specified channel, and returns a response message to the wireless management device. In the system shown in FIG. 1, the wireless management device 30 sends a channel switch request message that includes a specified channel to the three access point devices 31a, 31b, and 31c separately, and instructs each access point device in the three access point devices 31a, 31b, and 31c to switch to the specified channel. It should be noted that, the specified channel carried by the channel switch request message sent by the wireless management device 30 to each access point device in the three access point devices 31a, 31b, and 31c is a particular band, so that the three access point devices 31a, 31b, and 31c separately switch to the particular band, thereby ensuring that the three access point devices 31a, 31b, and 31c communicate with the wireless management device 30 in the same channel, and each return a response message to the wireless management device 30. That is, after switching to the specified channel, the three access point devices 31a, 31b, and 31c each reply a channel switch response message to the wireless management device 30, and then the wireless management device 30 replies an acknowledgment message to the three access point devices 31a, 31b, and 31c.

Then, the wireless management device determines a master access point device in the at least two access point devices, determines each access point device in the at least two access point devices except the master access point device as a slave access point device, and sends a spectrum scan request message to the master access point device. The wireless management device may compare interference values reported by all access point devices in the at least two access point devices, and select an access point device with a maximum interference value as a master access point device, and every other access point device, that is, each access point device in the at least two access point devices except the master access point device as a slave access point device, mark the master access point device, and send mark information to the master access point device. In other words, the wireless management device determines the master access point device according to an interference degree. In the system shown in FIG. 1, the wireless management device 30 determines, from the three access point devices 31a, 31b, and 31c according to an interference degree, the access point device 31a as a master access point device, and the other two access point devices 31b and 31c as slave access point devices.

501: After receiving the spectrum scan request message sent by the wireless management device, reply a spectrum scan response message. The master access point device in the at least two access point devices replies a spectrum scan response message after receiving the spectrum scan request sent by the wireless management device. That is, in the system shown in FIG. 1, after sending the spectrum scan request to the master access point device 31a, the wireless management device 30 receives a spectrum scan response message replied by the master access point device 31a.

502: Preset a scan start time, and send, to another access point device, a spectrum scan request message that carries information about the scan start time. After receiving the spectrum scan request message of the wireless management device, the master access point device presets a scan start time, then sends, to each slave access point device, a spectrum scan request message that carries information about the scan start time, and controls the slave access point device to start spectrum scanning at the preset scan start time. The scan start time is a relative time. The master access point device starts scanning after sending a spectrum scan request to each slave access point device and waiting the scan start time, and each slave access point device starts scanning after receiving the spectrum scan request of the master access point device and waiting the scan start time. Basically, it can be ensured that the master access point device and each slave access point device start scanning at the same time, thereby scanning pulse signals in a same time period.

503: Start spectrum scanning according to the scan start time, and collect spectrum information of the interference source. The master access point device starts spectrum scanning according to the scan start time, and collects spectrum information of the interference source. It can be understood that, each slave access point device in the at least two access point devices also starts spectrum scanning according to the scan start time, and collects spectrum information of an interference source.

In an actual execution process, after receiving a spectrum scan request, the master access point device 31a replies a spectrum scan response message; the master access point device 31a does not start scanning immediately but presets a scan start time, for example, t1, and then according to the scan start time, starts scanning after sending the spectrum scan request and waiting the scan start time t1. Meanwhile, the master access point device 31a sends, to the two slave access point devices 31b and 31c, the spectrum scan request message that carries the scan start time t1. After receiving the request, the two slave access point devices 31b and 31c set timing, and start scanning after receiving the spectrum scan request and waiting the scan start time t1. A message between the master access point device 31a and the slave access point devices 31b and 31c is transmitted using radio electromagnetic waves, where a difference between times when the message arrives at the two slave access point devices 31b and 31c is nanosecond-level and can be ignored compared with a millisecond level required by the spectrum scanning. Therefore, basically, it can be ensured that the three access point devices 31a, 31b, and 31c start scanning at the same time, thereby scanning pulse signals in a same time period.

That the master access point device sends, to another access point device, a spectrum scan request message that carries the information about the scan start time is implemented in two manners: one is sending, to the other access point device, using a broadcast frame, a spectrum scan request message that carries the information about the scan start time; and the other is sending, to the other access point device using a multicast frame, a spectrum scan request message that carries the information about the scan start time.

504: Send the collected spectrum information of the interference source to the wireless management device; the at least two access point devices each send the collected spectrum information of the interference source to the wireless management device. In the system shown in FIG. 1, the three access point devices 31a, 31b, and 31c each send the collected spectrum information of the interference source 20 to the wireless management device 30.

In the method for collecting interference provided in this embodiment, a master access point device is determined, and a master-slave control scan manner is used, that is, the master access point device controls a slave access point device to start spectrum scanning at a preset scan start time, so as to ensure that all access point devices can acquire interference characteristics in an overlapping time range, thereby further ensuring that the access point devices scan pulse signals in a same time period. In the method for collecting interference provided in this embodiment, based on an air interface relative time and without relying on time synchronization between access point devices, overlapping characteristics are obtained by means of spectrum scanning under master-slave control; the solution is simple and easy to implement, and has high identification accuracy.

Figure 8:
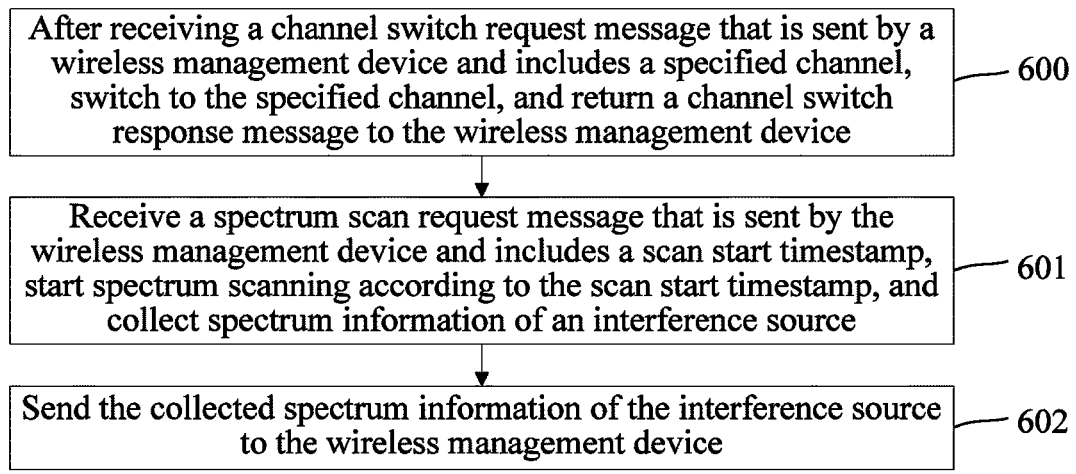
FIG. 8 is a schematic flowchart of still another method for collecting interference according to an embodiment of the present invention.

FIG. 8 illustrates a schematic flowchart of still another method for collecting interference according to an embodiment of the present invention. It should be particularly noted that, in this embodiment of the collection method, on the basis of the method for collecting interference shown in FIG. 6, a method for collecting interference that uses scanning under centralized control in step 400 is further introduced. As shown in FIG. 8, the method includes the following steps.

600: After receiving a channel switch request message that is sent by the wireless management device and includes a specified channel, switch to the specified channel, and return a channel switch response message to the wireless management device. After receiving a channel switch request message that is sent by the wireless management device and includes a specified channel, each access point device in the at least two access point devices switches to the specified channel, and returns a channel switch response message to the wireless management device. In the system shown in FIG. 1, the wireless management device 30 sends a channel switch request message that includes a specified channel to each access point device in the three access point devices 31a, 31b, and 31c, and instructs each access point device in the three access point devices 31a, 31b, and 31c to switch to the specified channel. It should be noted that, the specified channel carried by the channel switch request message sent by the wireless management device 30 to each access point device in the three access point devices 31*a*, 31*b*, and 31*c* is a particular band, so that the three access point devices 31*a*, 31*b*, and 31*c* separately switch to the particular band, thereby ensuring that the three access point devices 31*a*, 31*b*, and 31*c* communicate with the wireless management device 30 in the same channel, and each return a channel switch response message to the wireless management device 30. That is, after switching to the same channel, the three access point devices 31*a*, 31*b*, and 31*c* each reply a channel switch response message to the wireless management device 30, and then the wireless management device 30 replies an acknowledgment message to the three access point devices 31*a*, 31*b*, and 31*c*.

601: Receive a spectrum scan request message that is sent by the wireless management device and includes a scan start timestamp, start spectrum scanning according to the scan start timestamp, and collect spectrum information of an interference source. Each access point device in the at least two access point devices receives the spectrum scan request message that is sent by the wireless management device and includes a scan start timestamp, starts spectrum scanning according to the scan start timestamp, and collects spectrum information of an interference source. If response times of the at least two access point devices are synchronous, the spectrum scan request sent by the wireless management device to each access point device in the at least two access point devices includes a same scan start timestamp, and if response times of the at least two access point devices are not synchronous, the spectrum scan request sent by the wireless management device to each access point device in the at least two access point devices includes a different scan start timestamp.

In the system shown in FIG. 1, before the wireless management device sends the spectrum scan request message to the three access point devices 31*a*, 31*b*, and 31*c*, it needs to determine whether response times of the three access point devices 31*a*, 31*b*, and 31*c* are synchronous, where if the response times of the three access point devices 31*a*, 31*b*, and 31*c* are synchronous, the spectrum scan request sent to each access point device in the three access point devices 31*a*, 31*b*, and 31*c* includes a same scan start timestamp, and if the response times of the three access point devices 31*a*, 31*b*, and 31*c* are not synchronous, the spectrum scan request sent to each access point device in the at least two access point devices includes a different scan start timestamp.

602: Send the collected spectrum information of the interference source to the wireless management device. Each access point device in the at least two access point devices sends the collected spectrum information of the interference source to the wireless management device. In the system shown in FIG. 1, the three access point devices 31*a*, 31*b*, and 31*c* separately send the collected spectrum information of the interference source 20 to the wireless management device 30.

In the method for collecting interference provided in this embodiment, after receiving a spectrum scan request message that includes a scan start timestamp, each access point device in the at least two access point devices starts spectrum scanning according to the scan start timestamp, so as to achieve the objective of synchronously collecting spectrum information of interference sources. Because collection times of all access point devices are almost synchronous, the problem in the prior art that an identification result is inaccurate because of inconsistent collection times of the access point devices and a great difference between signal characteristics in different time periods can be solved.

Figure 9:
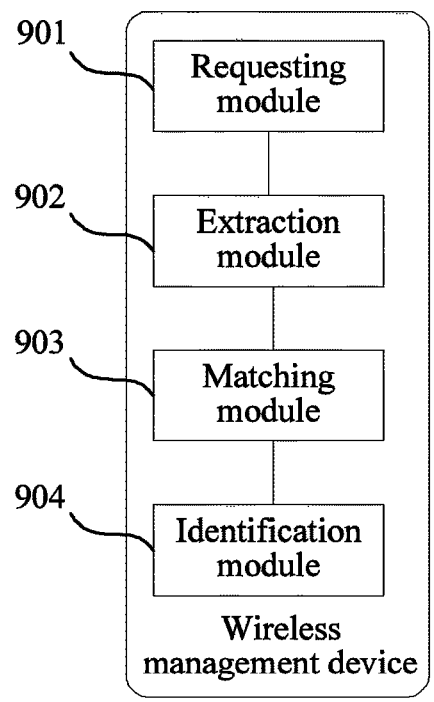
FIG. 9 is a principle block diagram of a wireless management device according to an embodiment of the present invention.

FIG. 9 illustrates a principle block diagram of a wireless management device according to an embodiment of the present invention. The wireless management device is used to implement the method for identifying interference shown in FIG. 2, FIG. 4 and FIG. 5 of the present invention. As shown in FIG. 9, the wireless management device of the present invention includes a requesting module 901, an extraction module 902, a matching module 903, and an identification module 904.

The requesting module 901 is configured to send, to at least two access point devices separately, a request for collecting spectrum information of an interference source. In the system shown in FIG. 1, the requesting module 901 is configured to send, to the three access point devices 31*a*, 31*b*, and 31*c* separately, a request for collecting spectrum information of an interference source.

The extraction module 902 is configured to receive, from each of the at least two access point devices, collected spectrum information of an interference source, and when it is determined that the spectrum information collected by the at least two access point devices includes spectrum information of interference sources that belong to a same device type, separately extract, from the spectrum information collected by the at least two access point devices, the spectrum information of the interference sources that belong to the same device type. In the system shown in FIG. 1, the extraction module 902 is configured to receive, from each of the three access point devices 31*a*, 31*b*, and 31*c*, collected spectrum information of an interference source, and when it is determined that the spectrum information collected by the three access point devices 31*a*, 31*b*, and 31*c* includes spectrum information of interference sources that belong to a same device type, separately extract, from the collected spectrum information of the three access point devices 31*a*, 31*b*, and 31*c*, the spectrum information of the interference sources that belong to the same device type; and the spectrum information includes one or more of FFT data, a start time and an end time, and a sampling time.

The matching module 903 is configured to match characteristic sequences in a same time period and in the separately extracted spectrum information of the interference sources that belong to the same device type, and calculate an overlapping characteristic match value of the characteristic sequences in the same time period; the characteristic sequence may be construed as a spectrum characteristic of an interference source in a time period, which includes one or more characteristics of types of a central frequency, a bandwidth, a pulse fingerprint, and a duty cycle.

The identification module 904 is configured to determine whether the overlapping characteristic match value is greater than a preset threshold, and if the overlapping characteristic match value is greater than the preset threshold, determine that the separately extracted spectrum information of the interference sources that belong to the same device type is from a same interference source, and if the overlapping characteristic match value is not greater than the preset threshold, determine that the separately extracted spectrum information of the interference sources that belong to the same device type is from different interference sources.

The overlapping characteristics are identical or similar characteristics in characteristic sequences that are in a same time period and in spectrum information, which is separately extracted by at least two access point devices, of interference sources that belong to a same device type. Refer to FIG. 3, which is a schematic principle diagram of overlapping characteristics according to an embodiment of the present invention. The three access point devices 31*a*, 31*b*, and 31*c* in the system shown in FIG. 1 are used as an example to describe how to identify overlapping characteristics. As shown in FIG. 3, characteristic sequences that are in a same time period, that is, T1, and in a total of three groups of spectrum information of the three access point devices 31*a*, 31*b*, and 31*c* are matched to calculate an overlapping characteristic match value.

The overlapping characteristic match value is a ratio or a positive integer. The overlapping characteristic match value is a ratio of spectrum information of an overlapping characteristic to all spectrum information of an interference source, that is, a ratio of spectrum information, which is separately extracted by at least two access point devices, of characteristic sequences in a same time period and in spectrum information of interference sources that belong to a same device type to all spectrum information of the interference source. Correspondingly, the preset threshold used for determining is a ratio, and the corresponding preset threshold may be set according to an empirical value, for example, 0.5. Alternatively, the overlapping characteristic match value is the number of overlapping characteristics, that is, the number of identical characteristics in consecutive two or more than two characteristic sequences in spectrum information extracted by one access point device and in characteristic sequences in spectrum information extracted by another access point device, where the spectrum information extracted by the access point devices is spectrum information of interference sources that belong to a same device type. Correspondingly, the preset threshold used for determining is an integer, for example, the corresponding threshold is set according to an empirical value, for example, 5.

In the system shown in FIG. 1, for example, the interference source 20 is Bluetooth; an overlapping characteristic match value is a ratio of spectrum information of an overlapping characteristic to all spectrum information of the interference source 20; a preset threshold for determining is 0.5; the wireless management device 30 matches characteristic sequences that are in a same time period and in a total of three groups of spectrum information of the access point devices 31*a*, 31*b*, and 31*c*; the calculated overlapping characteristic match value is 0.7, and therefore, it is determined that the match value is greater than the preset threshold 0.5, and it is determined that the separately extracted spectrum information of the interference sources that belong to the same device type is from a same interference source. In other words, if the wireless management device 30 matches the characteristic sequences that are in the same time period and in the total of three groups of spectrum information of the access point devices 31*a*, 31*b*, and 31*c*, and the calculated overlapping characteristic match value is 0.3, it is determined that the match value is not greater than the preset threshold 0.5, and it is determined that the separately extracted spectrum information of the interference sources that belong to the same device type is from different interference sources.

Figure 10:
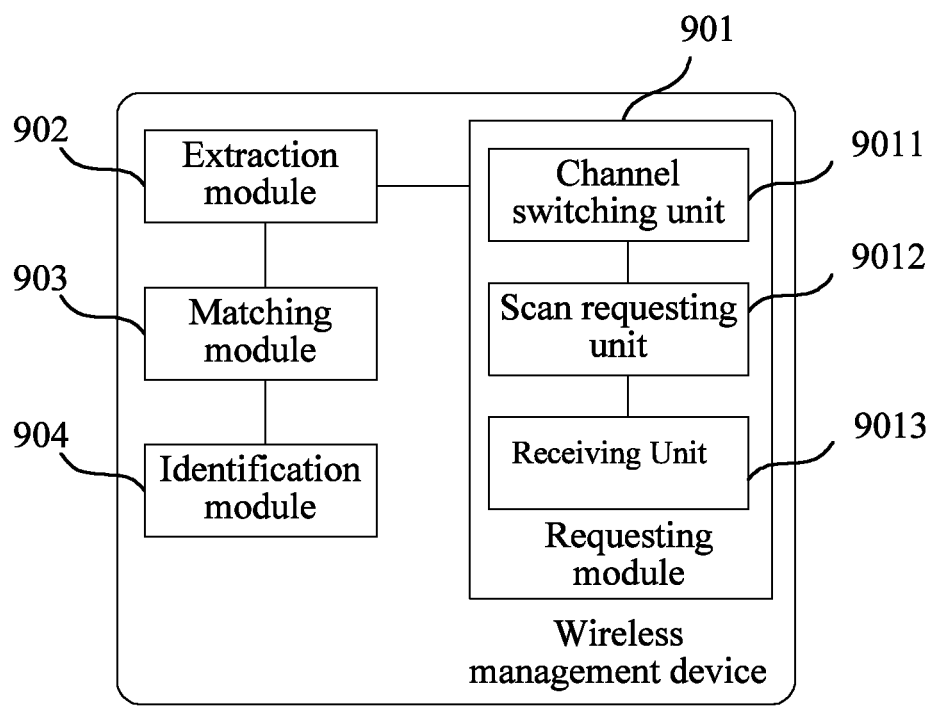
FIG. 10 is a principle block diagram of a requesting module in a wireless management device according to an embodiment of the present invention.

FIG. 10 illustrates a principle block diagram of another wireless management device according to an embodiment of the present invention. The wireless management device includes the modules shown in FIG. 9, where the requesting module 901 includes a channel switching unit 9011 and a scan requesting unit 9012.

The channel switching unit 9011 is configured to send a channel switch request message that includes a specified channel to each access point device in the at least two access point devices, and instruct the at least two access point devices to switch to the specified channel. In the system shown in FIG. 1, the channel switching unit 9011 is configured to send a channel switch request message that includes a specified channel to the three access point devices 31*a*, 31*b*, and 31*c*, instruct the three access point devices 31*a*, 31*b*, and 31*c* to switch to the specified channel, and after receiving a response message returned by each of the three access point devices 31*a*, 31*b*, and 31*c*, make an acknowledgment. It should be noted that, the specified channel carried in the channel switch request message sent by the wireless management device 30 to each access point device in the three access point devices 31*a*, 31*b*, and 31*c* is a particular band, so that the three access point devices 31*a*, 31*b*, and 31*c* separately switch to the particular band, so as to ensure that the three access point devices 31*a*, 31*b*, and 31*c* communicate with the wireless management device 30 in the same channel, and each return a response message to the wireless management device 30, that is, after switching to the specified channel, the three access point devices 31*a*, 31*b*, and 31*c* each reply a channel switch response message to the wireless management device 30, and then the wireless management device 30 replies an acknowledgment message to the three access point devices 31*a*, 31*b*, and 31*c*.

The scan requesting unit 9012 is connected to the channel switching unit 9011, and is configured to send a spectrum scan request to the at least two access point devices, so that the at least two access point devices each collect spectrum information of an interference source.

In an implementation manner of this embodiment, the wireless communications network uses a master-slave control scan manner. The wireless management device determines a master access point device, and acquires an interference characteristic in an overlapping time range between the master access point device and each slave access point device. The scan requesting unit 9012 is configured to determine a master access point device in the at least two access point devices, determine each access point device in the at least two access point devices except the master access point device as a slave access point device, send a spectrum scan request message to the master access point device, and request the master access point device to send, to each slave access point device, the spectrum scan request message that carries information about a scan start time, so that the master access point device and each slave access point device start collecting spectrum information of interference sources at the scan start time. After receiving the spectrum scan request message sent by the wireless management device, the master access point device presets the scan start time, and then sends, to each slave access point device, the spectrum scan request message that carries the information about the scan start time. The scan start time is a relative time. The master access point device starts scanning after the scan start time which is started when the spectrum scan request is sent to each slave access point device, and each slave access point device starts scanning after the scan start time which is started when the spectrum scan request of the master access point device is received.

That the scan requesting unit 9012 determines a master access point device from the multiple access point devices and determines each access point device in the at least two access point devices except the master access point device as a slave access point device is comparing interference values reported by all access point devices in the at least two access point devices, selecting an access point device with a maximum interference value as the master access point device, and every other access point device, that is, each access point device in the at least two access point devices except the master access point device as a slave access point device, marking the master access point device, and sending mark information to the master access point device.

In the system shown in FIG. 1, the wireless management device 30 determines, from the three access point devices 31a, 31b, and 31c according to an interference degree, the access point device 31a as the master access point device, and the other two access point devices 31b and 31c as slave access point devices; then the wireless management device 30 sends a spectrum scan request to the master access point device 31a, so that the master access point device 31a presets a scan start time, and requests the master access point device 31a to send, to the slave access point devices 31b and 31c, a spectrum scan request message that carries the scan start time, so that the master access point device controls the slave access point devices 31b and 31c to start spectrum scanning at the scan start time. Basically, it can be ensured that the three access point devices 31a, 31b, and 31c start scanning at the same time, thereby scanning pulse signals in a same time period; and optionally, after sending the spectrum scan request message to the master access point device 31a, the wireless management device 30 receives a spectrum scan response message replied by the master access point device 31a.

In an actual execution process, after receiving a spectrum scan request, the master access point device 31a replies a spectrum scan response message; the master access point device 31a does not start scanning immediately but presets a scan start time, for example, t1, and then according to the scan start time, starts scanning after sending the spectrum scan request and waiting the scan start time t1. Meanwhile, the master access point device 31a sends, to the two slave access point devices 31b and 31c, the spectrum scan request message that carries the scan start time t1. After receiving the request, the two slave access point devices 31b and 31c set timing, and start scanning after receiving the spectrum scan request and waiting the scan start time t1. A message between the master access point device 31a and the slave access point devices 31b and 31c is transmitted using radio electromagnetic waves, where a difference between times when the message arrives at the two slave access point devices 31b and 31c is nanosecond-level and can be ignored compared with a millisecond level required by the spectrum scanning. Therefore, basically, it can be ensured that the three access point devices 31a, 31b, and 31c start scanning at the same time, thereby scanning pulse signals in a same time period.

The scan requesting unit 9012 may request the master access point device to send, to the slave access point devices 31b and 31c using a broadcast frame, a spectrum scan request message that carries the information about the scan start time; or may also preset the master access point device and the slave access point devices as a multicast group or pre-configure a multicast address, and then request the master access point device to send, to the slave access point devices using a multicast frame, a spectrum scan request message that carries the information about the scan start time.

The extraction module 902 is configured to receive, from the master access point device and each slave access point device, the spectrum information of the interference sources, and when it is determined that the spectrum information collected by the master access point device and each slave access point device includes spectrum information of interference sources that belong to a same device type, separately extract, from the spectrum information collected by the master access point device and each slave access point device, the spectrum information of the interference sources that belong to the same device type.

In another implementation manner of this embodiment, the wireless communications network uses a centralized control scan manner. The wireless management device ensures that the at least two access point devices acquire interference characteristics in an overlapping time range. The scan requesting unit 9012 is configured to send, to each access point device in the at least two access point devices separately, a spectrum scan request message that carries a scan start timestamp; and the receiving unit 9013 is configured to receive the spectrum information of the interference source collected by each of the at least two access point devices after spectrum scanning is started according to the scan start timestamp. In the system shown in FIG. 1, the receiving unit 9013 is configured to receive the spectrum information of the interference source 20 collected by the three access point devices 31a, 31b, and 31c after spectrum scanning is started according to the scan start timestamp.

The scan requesting unit 9012 is further configured to determine whether response times of the at least two access point devices are synchronous, if the response times of the at least two access point devices are synchronous, send, to the at least two access point devices, spectrum scan request messages that carry identical scan start timestamps; and if the response times of the at least two access point devices are not synchronous, send, to the at least two access point devices separately according to the response times of the at least two access point devices, spectrum scan request messages that carry different scan start timestamps.

In an implementation manner provided in this embodiment, based on an air interface relative time and without relying on time synchronization between access point devices, the wireless management device can obtain an overlapping characteristic by means of spectrum scanning under master-slave control; the solution is simple and easy to implement and has high identification accuracy. In another implementation manner, according to a relative time between access point devices, the wireless management device sets a scan start timestamp and requests the access point devices to synchronously collect spectrum information of interference sources, thereby solving the problem in the prior art that an identification result is inaccurate because of inconsistent collection times of each access point device and a great difference between signal characteristics in different time periods.

Figure 11:
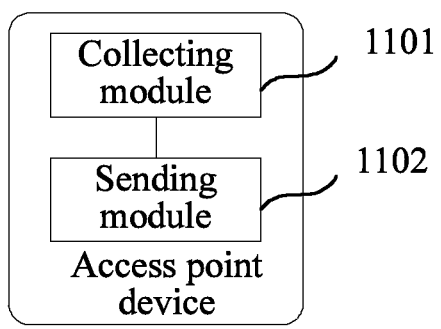
FIG. 11 is a principle block diagram of an access point device according to an embodiment of the present invention.

Refer to FIG. 11, which is a principle block diagram of an access point device according to an embodiment of the present invention. The access point device is used to implement the method for collecting interference shown in FIG. 6, FIG. 7 and FIG. 8 of the present invention. As shown in FIG. 11, the access point device includes a collecting module 1101 and a sending module 1102.

The collecting module 1101 is configured to collect spectrum information of an interference source according to a request of a wireless management device. For example, in the system shown in FIG. 1, the collecting module 1101 of each of the three access point devices 31a, 31b, and 31c collects spectrum information of an interference source according to a request of the wireless management device 30.

The sending module 1102 is configured to send, to the wireless management device, the spectrum information of the interference source collected by the collecting module 1101. That is, the sending module 1102 of each of the three access point devices 31*a*, 31*b*, and 31*c* sends the collected spectrum information of the interference source 20 to the wireless management device 30.

The collecting module 1101 is configured to receive a channel switch request message that is sent by the wireless management device and includes a specified channel, and switch to the specified channel; and optionally, is further configured to return a channel switch response message to the wireless management device. In the system shown in FIG. 1, after the three access point devices 31*a*, 31*b*, and 31*c* each receive the channel switch request message that is sent by the wireless management device 30 and includes a specified channel, the three access point devices 31*a*, 31*b*, and 31*c* all switch to the specified channel. It should be noted that, the specified channel carried in the channel switch request message is a particular band, so that the three access point devices 31*a*, 31*b*, and 31*c* separately switch to the particular band, thereby ensuring that the three access point devices 31*a*, 31*b*, and 31*c* communicate with the wireless management device 30 in the same channel.

In a possible implementation manner, the access point device uses a master-slave control scan manner; the wireless management device determines a master access point device in the at least two access point devices, determines each access point device in the at least two access point devices except the master access point device as a slave access point device, and then sends a spectrum scan request message to the master access point device. The wireless management device compares interference values reported by the at least two access point devices, selects an access point device with a maximum interference value as the master access point device, and every other access point device, that is, each access point device in the at least two access point devices except the master access point device as a slave access point device, marks the master access point device, and sends mark information to the master access point device. In other words, the wireless management device determines the master access point device according to an interference degree, and then the master access point device ensures that all access point devices can acquire interference characteristics in an overlapping time range.

If the access point device is the master access point device, the collecting module 1101 is further configured to receive a spectrum scan request message sent by the wireless management device, preset a scan start time, start spectrum scanning according to the scan start time, and collect spectrum information of an interference source. The collecting module 1101 is further configured to send, to another access point device, a spectrum scan request message that carries the information about the scan start time, so that the other access point device starts spectrum scanning according to the scan start time, and collects spectrum information of an interference source. Optionally, the collecting module 1101 is further configured to reply a spectrum scan response message to the wireless management device. The collecting module 1101 may send, to the other access point device using a broadcast frame, a spectrum scan request message that carries the information about the scan start time; or send, to the other access point device using a multicast frame, a spectrum scan request message that carries the information about the scan start time. In this case, the wireless management device presets the master access point device and each slave access point device as a multicast group or configures a multicast address. The scan start time is a relative time. The master access point device starts scanning after the scan start time which is started when a spectrum scan request is sent to each slave access point device, and each slave access point device starts scanning after the scan start time which is started when the spectrum scan request of the master access point device is received. Basically, it can be ensured that the master access point device and each slave access point device start scanning at the same time, thereby scanning pulse signals in a same time period.

In another possible implementation manner, the access point device uses a centralized control scan manner, and the wireless management device controls each access point device to synchronously collect spectrum information of an interference source. The collecting module 1101 is further configured to receive a spectrum scan request message that is sent by the wireless management device and includes a scan start timestamp, start spectrum scanning according to the scan start timestamp, and collect spectrum information of an interference source. Optionally, the collecting module 1101 is further configured to reply a spectrum scan response message to the wireless management device.

In the method for collecting interference provided in this embodiment, a wireless management device sends a spectrum scan request message that includes a scan start timestamp to an access point device, so that the access point device starts spectrum scanning according to the scan start timestamp, and ensures that all access point devices synchronously collect spectrum information of interference sources, thereby solving the problem in the prior art that an identification result is inaccurate because of inconsistent collection times of the access point devices and a great difference between signal characteristics in different time periods.

Figure 12:
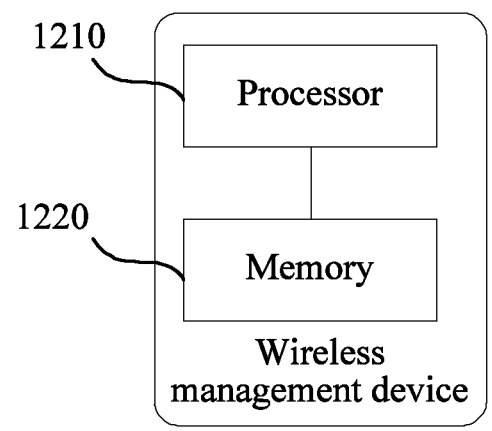
FIG. 12 is a schematic structural diagram of a wireless management device according to an embodiment of the present invention.

FIG. 12 illustrates a schematic structural diagram of a wireless management device according to an embodiment of the present invention. As shown in the FIG. 12, the wireless management device includes a processor 1210 and a memory 1220, where the processor 1210 may communicate with the memory 1220 by means of a bus. The memory 1220 stores program code, where the program code includes a computer operating instruction.

The processor 1210 executes the program code, and may implement the method for identifying interference shown in FIG. 2, FIG. 4 and FIG. 5 of the present invention.

The processor 1210 executes the program code, and is configured to request at least two access point devices to separately collect spectrum information of an interference source; receive, from each of the at least two access point devices, collected spectrum information of an interference source, determine that the spectrum information collected by the at least two access point devices includes spectrum information of interference sources that belong to a same device type; separately extract, from the spectrum information collected by the at least two access point devices, the spectrum information of the interference sources that belong to the same device type; match characteristic sequences that are in a same time period and in the separately extracted spectrum information of the interference sources that belong to the same device type, calculate an overlapping characteristic match value of the characteristic sequences in the same time period; and determine whether the overlapping characteristic match value is greater than a preset threshold, and if the overlapping characteristic match value is greater than the preset threshold, determine that the separately extracted spectrum information of the interference sources that belong to the same device type is from a same interference source, and if the overlapping characteristic match value is not greater than the preset threshold, determine that the separately extracted spectrum information of the interference sources that belong to the same device type is from different interference sources.

The memory 1220 may be further configured to store spectrum information.

The overlapping characteristics are identical or similar characteristics in characteristic sequences that are in a same time period and in spectrum information, which is separately extracted by at least two access point devices, of interference sources that belong to a same device type. Refer to FIG. 3, which is a schematic principle diagram of overlapping characteristics according to an embodiment of the present invention. The three access point devices 31a, 31b, and 31c in the system shown in FIG. 1 are used as an example to describe how to identify overlapping characteristics. As shown in FIG. 3, characteristic sequences that are in a same time period, that is, T1, and in a total of three groups of spectrum information of the three access point devices 31a, 31b, and 31c are matched to calculate an overlapping characteristic match value.

The overlapping characteristic match value is a ratio or a positive integer. The overlapping characteristic match value is a ratio of spectrum information of an overlapping characteristic to all spectrum information of an interference source, that is, a ratio of spectrum information, which is separately extracted by at least two access point devices, of characteristic sequences in a same time period and in spectrum information of interference sources that belong to a same device type to all spectrum information of the interference source. Correspondingly, the preset threshold used for determining is a ratio, and the corresponding preset threshold may be set according to an empirical value, for example, 0.5. Alternatively, the overlapping characteristic match value is the number of overlapping characteristics, that is, the number of identical characteristics in consecutive two or more than two characteristic sequences in spectrum information extracted by one access point device and in characteristic sequences in spectrum information extracted by another access point device, where the spectrum information extracted by the access point devices is spectrum information of interference sources that belong to a same device type. Correspondingly, the preset threshold used for determining is an integer, for example, the corresponding threshold is set according to an empirical value, for example, 5.

The processor 1210 is configured to send a channel switch request message that includes a specified channel to each access point device in the at least two access point devices, and instruct the at least two access point devices to switch to the specified channel; receive a channel switch response message returned by each access point device in the at least two access point devices; determine a master access point device in the at least two access point devices, determine each access point device in the at least two access point devices except the master access point device as a slave access point device, send a spectrum scan request message to the master access point device, and request the master access point device to send, to each slave access point device, a spectrum scan request message that carries information about a scan start time; and receive a spectrum scan response message replied by the master access point device. The scan start time is a relative time. The master access point device starts scanning after the scan start time which is started when a spectrum scan request is sent to each slave access point device, and each slave access point device starts scanning after the scan start time which is started when the spectrum scan request of the master access point device is received. Basically, it can be ensured that the master access point device and each slave access point device start scanning at the same time, thereby scanning pulse signals in a same time period.

Alternatively, the processor 1210 is configured to send a channel switch request message that includes a specified channel to each access point device in the at least two access point devices, and instruct the at least two access point devices to switch to the specified channel; receive a channel switch response message returned by each access point device in the at least two access point devices; and send a spectrum scan request message to each access point device in the at least two access point devices, where the spectrum scan request message includes a scan start timestamp, so that each access point device in the at least two access point devices starts spectrum scanning according to the scan start timestamp, and collects spectrum information of an interference source.

Figure 13:
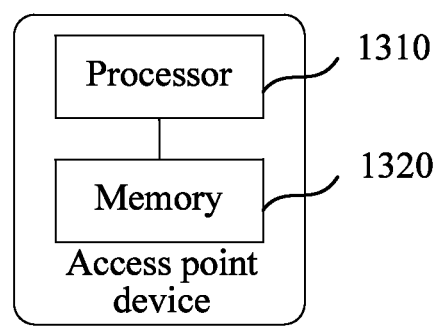
FIG. 13 is a schematic structural diagram of an access point device according to an embodiment of the present invention.

FIG. 13 illustrates a schematic structural diagram of an access point device according to an embodiment of the present invention. As shown in the FIG. 13, the access point device includes a processor 1310 and a memory 1320, where the processor 1310 may communicate with the memory 1320 by means of a bus. The memory 1310 stores program code, where the program code includes a computer operating instruction. The processor 1310 executes the program code, and may implement the method for collecting interference shown in FIG. 6, FIG. 7 and FIG. 8 of the present invention.

The processor 1310 is configured to collect spectrum information of an interference source according to a request of the wireless management device, and send the collected spectrum information of the interference source to the wireless management device.

The memory 1310 may be further configured to store spectrum information.

The processor 1310 is configured to, after receiving a channel switch request message that is sent by the wireless management device and includes a specified channel, switch to the specified channel, and return a channel switch response message to the wireless management device; receive a spectrum scan request message sent by the wireless management device, preset a scan start time, send, to another access point device, a spectrum scan request message that carries information about the scan start time, start spectrum scanning according to the scan start time, and collect spectrum information of an interference source. The processor 1310 may send, to the other access point device using a broadcast frame, the spectrum scan request message that carries the information about the scan start time; or, send, to the other access point device using a multicast frame, the spectrum scan request message that carries the information about the scan start time. The scan start time is a relative time. The master access point device starts scanning after the scan start time which is started when the spectrum scan request is sent to each slave access point device, and each slave access point device starts scanning after the scan start time which is started when the spectrum scan request of the master access point device is received. Basically, it can be ensured that the master access point device and each slave access point device start scanning at the same time, thereby scanning pulse signals in a same time period.

The processor 1310 is configured to, after receiving a channel switch request message that is sent by the wireless management device and includes a specified channel, switch to the specified channel, and return a channel switch response message to the wireless management device; and receive a spectrum scan request message that is sent by the wireless management device and includes a scan start timestamp, start spectrum scanning according to the scan start timestamp, and collect spectrum information of an interference source.

In conclusion, in the method and the system provided in the present invention, a manner of matching overlapping characteristics is used, which has high accuracy in identifying an interference source, and the solution is simple and easy to implement. In addition, a normal wireless access service is not affected in an identification process. Because collection time of all access point devices is almost synchronous, the problem in the prior art that an identification result may be inaccurate because of inconsistent collection time of the access point devices and a great difference between signal characteristics in different time periods is further solved. Therefore, the present invention effectively overcomes the disadvantages in the prior art and has a high industrial utilization value.

The foregoing embodiments are merely used to describe the principle and effectiveness of the present invention, but are not intended to limit the present invention. Any variation or replacement readily figured out by a person skilled in the art within the technical scope disclosed in the present invention shall fall within the protection scope of the present invention. Therefore, the project scope of the present invention is subject to the protection scope of the claims.

What is claimed is:

1. A method for identifying interference, applied to a wireless communications network that comprises a wireless management device and at least two access point devices, the method comprising:
    sending a channel switch request message that comprises a specified channel to each access point device, to instruct the at least two access point devices to switch to the specified channel;
    receiving a channel switch response message from each access point device;
    determining, based on received channel switch response messages from the at least two access point devices, one of the at least two access point device as a master access point device, and every other access point device except the master access point device as a slave access point device;
    sending a spectrum scan request message to the master access point device, requesting the master access point device to send to each slave access point device, a spectrum scan request message that comprises information about a scan start time, such that each access point device starts spectrum scanning according to the scan start time and collects spectrum information of an interference source;
    receiving, from each of the at least two access point devices, collected spectrum information of the interference source;
    determining that the spectrum information collected by the at least two access point devices comprises spectrum information of interference sources that belong to a same device type;
    separately extracting, from the spectrum information collected by the at least two access point devices, the spectrum information of the interference sources that belong to the same device type;
    matching characteristic sequences that are in a same time period and in the separately extracted spectrum information of the interference sources that belong to the same device type;
    calculating an overlapping characteristic match value of the characteristic sequences in the same time period;
    determining whether the overlapping characteristic match value is greater than a preset threshold;
    determining that the separately extracted spectrum information of the interference sources that belong to the same device type is from a same interference source when the overlapping characteristic match value is greater than the preset threshold; and
    determining that the separately extracted spectrum information of the interference sources that belong to the same device type is from different interference sources when the overlapping characteristic match value is not greater than the preset threshold.

2. The method according to claim 1, wherein determining one of the at least two access point device as a master access point device, and every other access point device except the master access point device as a slave access point device comprises:
    comparing interference values reported by all access point devices in the at least two access point devices; and
    selecting an access point device with a maximum interference value as the master access point device, and every other access point device as a slave access point device.

3. The method according to claim 1, wherein requesting the master access point device to send, to each slave access point device, the spectrum scan request message that carries information about the scan start time comprises:
    requesting the master access point device to send, to each slave access point device using a broadcast frame, the spectrum scan request message that carries the information about the scan start time.

4. The method according to claim 1, wherein requesting the master access point device to send, to each slave access point device, the spectrum scan request message that comprises information about the scan start time further comprises:
    presetting the master access point device and each slave access point device as a multicast group or pre-configuring a multicast address; and
    requesting the master access point device to send, to each slave access point device using a multicast frame, the spectrum scan request message that carries the information about the scan start time.

5. A method for identifying interference, applied to a wireless communications network that comprises a wireless management device and at least two access point devices, the method comprising:
    sending a channel switch request message that specifies a channel to each access point device to instruct the at least two access point devices to switch to the specified channel;
    receiving a channel switch response message from each access point device;
    determining whether response time of the at least two access point devices is synchronous, and sending a spectrum scan request message to each access point device such that each access point device starts spectrum scanning according to the scan start timestamp and collects spectrum information of an interference source, wherein, when the response time of the at least two access point devices is synchronous, the spectrum scan request message sent to each access point device comprises a same scan start timestamp, and wherein, when the response time of the at least two access point devices is not synchronous, the spectrum scan request message sent to each access point device comprises a different scan start timestamp;

receiving, from each of the at least two access point devices, collected spectrum information of the interference source;

determining that the spectrum information collected by the at least two access point devices comprises spectrum information of interference sources that belong to a same device type;

separately extracting, from the spectrum information collected by the at least two access point devices, the spectrum information of the interference sources that belong to the same device type;

matching characteristic sequences that are in a same time period and in the separately extracted spectrum information of the interference sources that belong to the same device type;

calculating an overlapping characteristic match value of the characteristic sequences in the same time period;

determining whether the overlapping characteristic match value is greater than a preset threshold;

determining that the separately extracted spectrum information of the interference sources that belong to the same device type is from a same interference source when the overlapping characteristic match value is greater than the preset threshold; and determining that the separately extracted spectrum information of the interference sources that belong to the same device type is from different interference sources when the overlapping characteristic match value is not greater than the preset threshold.

6. A wireless management device comprising:

a memory comprising instructions; and a processor coupled to the memory and configured to execute the instructions to:

send a channel switch request message that comprises a specified channel to each access point device in at least two access point device, to instruct the at least two access point devices to switch to the specified channel;

receive a channel switch response message returned by each access point device;

determine, based on received channel switch response messages from the at least two access point devices, one of the at least two access point device as a master access point device, and every other access point device except the master access point device as a slave access point device;

send a spectrum scan request message to the master access point device, to request the master access point device to send to each slave access point device, a spectrum scan request message that carries information about a scan start time, such that each access point device starts spectrum scanning according to the scan start time and collects spectrum information of an interference source;

receive from each of the at least two access point devices, collected spectrum information of the interference source;

determine that the spectrum information collected by the at least two access point devices comprises spectrum information of interference sources that belong to a same device type;

separately extract, from the spectrum information collected by the at least two access point devices, the spectrum information of the interference sources that belong to the same device type;

match characteristic sequences that are in a same time period and in the separately extracted spectrum information of the interference sources that belong to the same device type;

calculate an overlapping characteristic match value of the characteristic sequences in the same time period;

determine whether the overlapping characteristic match value is greater than a preset threshold;

determine that the separately extracted spectrum information of the interference sources that belong to the same device type is from a same interference source when the overlapping characteristic match value is greater than the preset threshold; and determine that the separately extracted spectrum information of the interference sources that belong to the same device type is from different interference sources when the overlapping characteristic match value is not greater than the preset threshold.

7. The wireless management device according to claim 6, wherein the processor is configured to execute the instructions to:

compare interference values reported by all access point devices in the at least two access point devices; and select an access point device with a maximum interference value as the master access point device, and every other access point device as a slave access point device.

8. The wireless management device according to claim 6, wherein the processor is configured to execute the instructions to:

request the master access point device to send, to each slave access point device using a broadcast frame, the spectrum scan request message that carries the information about the scan start time.

9. The wireless management device according to claim 6, wherein the processor is configured to execute the instructions to:

preset the master access point device and each slave access point device as a multicast group or pre-configuring a multicast address; and request the master access point device to send, to each slave access point device using a multicast frame, the spectrum scan request message that carries the information about the scan start time.

10. A wireless management device comprising:

a memory comprising instructions; and a processor coupled to the memory and configured to execute the instructions to:

send a channel switch request message that comprises a specified channel to each access point device in at least two access point devices to instruct the at least two access point devices to switch to the specified channel;

receive a channel switch response message returned by each access point device;

determine whether response time of the at least two access point devices is synchronous, and send a spectrum scan request message to each access point device such that each access point device starts spectrum scanning according to the scan start timestamp and collects spectrum information of an interference source, wherein, when the response time of the at least two access point devices is synchronous, the spectrum scan request message sent to each access point device comprises a same scan start timestamp, and wherein, when the response time of the at least two access point devices is not synchronous, the spectrum scan request message sent to each access point device comprises a different scan start timestamp;

receive from each of the at least two access point devices, collected spectrum information of the interference source;

determine that the spectrum information collected by the at least two access point devices comprises spectrum information of interference sources that belong to a same device type;

separately extract, from the spectrum information collected by the at least two access point devices, the spectrum information of the interference sources that belong to the same device type;

match characteristic sequences that are in a same time period and in the separately extracted spectrum information of the interference sources that belong to the same device type;

calculate an overlapping characteristic match value of the characteristic sequences in the same time period;

determine whether the overlapping characteristic match value is greater than a preset threshold;

determine that the separately extracted spectrum information of the interference sources that belong to the same device type is from a same interference source when the overlapping characteristic match value is greater than the preset threshold; and determine that the separately extracted spectrum information of the interference sources that belong to the same device type is from different interference sources when the overlapping characteristic match value is not greater than the preset threshold.

11. A wireless communications network for identifying interference, comprising a wireless management device and at least two access point devices;

the wireless management device comprising:

a first memory comprising instructions; and a first processor coupled to the first memory and configured to execute the instructions to:

send a channel switch request message that comprises a specified channel to each access point device in at least two access point device, to instruct the at least two access point devices to switch to the specified channel;

receive a channel switch response message from each access point device;

determine based on received channel switch response messages from the at least two access point devices, one of the at least two access point device as a master access point device, and each other access point device except the master access point device as a slave access point device;

send a spectrum scan request message to the master access point device, requesting the master access point device to send to each slave access point device, a spectrum scan request message that carries information about a scan start time;

receive from each of the at least two access point devices, collected spectrum information of an interference source;

determine that the spectrum information collected by the at least two access point devices comprises spectrum information of interference sources that belong to a same device type;

separately extract, from the spectrum information collected by the at least two access point devices, the spectrum information of the interference sources that belong to the same device type;

match characteristic sequences that are in a same time period and in the separately extracted spectrum information of the interference sources that belong to the same device type;

calculate an overlapping characteristic match value of the characteristic sequences in the same time period;

determine whether the overlapping characteristic match value is greater than a preset threshold;

determine that the separately extracted spectrum information of the interference sources that belong to the same device type is from a same interference source when the overlapping characteristic match value is greater than the preset threshold; and determine that the separately extracted spectrum information of the interference sources that belong to the same device type is from different interference sources when the overlapping characteristic match value is not greater than the preset threshold; and an access point device in the at least two access point device comprising:

a second memory comprising instructions; and a second processor coupled to the second memory and configured to execute the instructions to:

receive the channel switch request message sent by the wireless management device, and switch to the specified channel;

return the channel switch response message to the wireless management device;

receive the spectrum scan request message sent by the wireless management device, preset the scan start time, and send to every other access point device in the at least two access point devices, the spectrum scan request message that carries information about the scan start time;

start spectrum scanning according to the scan start time; and collect spectrum information of the interference source.

* * * * *